United States Patent
Gross et al.

(10) Patent No.: US 11,548,265 B2
(45) Date of Patent: Jan. 10, 2023

(54) SCRATCH AND DAMAGE RESISTANT LAMINATED GLASS ARTICLES

(71) Applicant: CORNING INCORPORATED, Corning, NY (US)

(72) Inventors: Timothy Michael Gross, Corning, NY (US); Charlene Marie Smith, Corning, NY (US)

(73) Assignee: Corning Incorporated, Corning, NY (US)

( * ) Notice: Subject to any disclaimer, the term of this patent is extended or adjusted under 35 U.S.C. 154(b) by 142 days.

(21) Appl. No.: 16/823,939

(22) Filed: Mar. 19, 2020

(65) Prior Publication Data

US 2020/0307164 A1   Oct. 1, 2020

Related U.S. Application Data

(60) Provisional application No. 62/826,344, filed on Mar. 29, 2019.

(51) Int. Cl.
*B32B 17/06* (2006.01)
*B32B 7/023* (2019.01)
(Continued)

(52) U.S. Cl.
CPC .............. *B32B 17/06* (2013.01); *B32B 7/023* (2019.01); *C03B 17/064* (2013.01);
(Continued)

(58) Field of Classification Search
CPC ......... B32B 7/00–7/14; B32B 17/00–17/1099; C03C 3/076–3/118
See application file for complete search history.

(56) References Cited

U.S. PATENT DOCUMENTS

| 4,023,953 A | 5/1977 | Megles et al. |
| 10,196,295 B2 | 2/2019 | Gulati et al. |

(Continued)

FOREIGN PATENT DOCUMENTS

WO   WO-2017196800 A1 * 11/2017 ....... B32B 17/10834

OTHER PUBLICATIONS

"Corning Gorilla Glass: Technical Materials", Corning Incorporated, (2008); pp. 1-2.*

(Continued)

*Primary Examiner* — Prashant J Khatri

(74) *Attorney, Agent, or Firm* — Kevin M. Johnson; Kapil Banakar

(57) ABSTRACT

Scratch and damage resistant laminated glass articles are disclosed. According to one aspect, a laminated glass article may include a glass core layer formed from core glass composition and includes a core glass elastic modulus $E_C$ and at least one glass clad layer fused directly to the glass core layer. The at least one glass clad layer may be formed from an ion exchangeable clad glass composition different than the core glass composition and includes a clad glass elastic modulus $E_{CL}$. The laminated glass article may have a total thickness T and the at least one glass clad layer may have a thickness $T_{CL}$ that is greater than or equal to 30% of the total thickness T. $E_C$ may be at least 5% greater than $E_{CL}$.

29 Claims, 8 Drawing Sheets

(51) Int. Cl.
*C03B 17/06* (2006.01)
*C03C 21/00* (2006.01)

(52) U.S. Cl.
CPC ........ *C03C 21/002* (2013.01); *B32B 2250/40* (2013.01); *B32B 2307/558* (2013.01); *B32B 2307/584* (2013.01); *B32B 2315/08* (2013.01)

(56) References Cited

U.S. PATENT DOCUMENTS

| | | | |
|---|---|---|---|
| 2009/0163342 A1 | 6/2009 | Kolberg et al. | |
| 2011/0318555 A1 | 12/2011 | Bookbinder et al. | |
| 2013/0224491 A1* | 8/2013 | Smedskjaer | ............ C03C 3/091 501/67 |
| 2014/0138420 A1 | 5/2014 | Peng et al. | |
| 2014/0141226 A1* | 5/2014 | Bookbinder | .......... C03C 21/002 501/64 |
| 2015/0140299 A1* | 5/2015 | Ellison | .................... B32B 17/06 428/212 |
| 2015/0251383 A1 | 9/2015 | Beall et al. | |
| 2016/0194235 A1* | 7/2016 | Hart | ...................... C03C 21/002 428/410 |
| 2017/0174564 A1 | 6/2017 | Cleary et al. | |
| 2017/0282503 A1 | 10/2017 | Peng et al. | |
| 2017/0297308 A1 | 10/2017 | Golyatin et al. | |
| 2017/0341973 A1* | 11/2017 | Gross | ...................... C03C 3/097 |
| 2018/0304588 A1 | 10/2018 | Harris et al. | |
| 2018/0327296 A1 | 11/2018 | Ellison et al. | |
| 2019/0225538 A1 | 7/2019 | Harris et al. | |
| 2019/0352225 A1 | 11/2019 | Harris et al. | |

OTHER PUBLICATIONS

Invitation To Pay Additional Fees of the International Searching Authority; PCT/US2020/023545; Mailed Jul. 10, 2020; 14 Pages; European Patent Office.

* cited by examiner

SCRATCH AND DAMAGE RESISTANT LAMINATED GLASS ARTICLES

This application claims the benefit of priority under 35 U.S.C. § 119 of U.S. Provisional Application Ser. No. 62/826,344 filed on Mar. 29, 2019, the content of which is relied upon and incorporated herein by reference in its entirety.

BACKGROUND

Field

The present specification generally relates to laminated glass articles and, more particularly, to laminated glass articles that are resistant to scratching and drop-induced damage.

Technical Background

Glass articles, such as cover glasses, glass backplanes and the like, are employed in both consumer and commercial electronic devices such as LCD and LED displays, computer monitors, automated teller machines (ATMs) and the like. Some of these glass articles may include "touch" functionality which necessitates that the glass article be contacted by various objects including a user's fingers and/or stylus devices and, as such, the glass must be sufficiently robust to endure regular contact without damage, such a scratching. Indeed, scratches introduced into the surface of the glass article may reduce the strength of the glass article as the scratches may serve as initiation points for cracks leading to catastrophic failure of the glass.

Moreover, such glass articles may also be incorporated in portable electronic devices, such as mobile telephones, personal media players, laptop computers and tablet computers. The glass articles incorporated in these devices may be susceptible to sharp impact damage during transport and/or use of the associated device. Sharp impact damage may include, for example, damage caused by dropping the device. Such damage may lead to failure of the glass.

Accordingly, a need exists for alternative glass articles that are both resistant to scratching and to drop-induced damage.

SUMMARY

According to a first aspect A1, a laminated glass article includes a glass core layer formed from a core glass composition and comprising a core glass elastic modulus $E_C$. At least one glass clad layer may be fused directly to the glass core layer, the at least one glass clad layer formed from an ion exchangeable clad glass composition different than the core glass composition, the at least one glass clad layer comprising a clad glass elastic modulus $E_{CL}$. The laminated glass article may have a total thickness T and the at least one glass clad layer has a thickness $T_{CL}$ that is greater than or equal to 30% of the total thickness T. $E_C$ may be at least 5% greater than $E_{CL}$.

A second aspect A2 includes the laminated glass article of aspect A1, wherein $E_{CL}$ is less than or equal to 76.5 GPa.

A third aspect A3 includes the laminated glass article of any of A1 or A2, wherein $E_{CL}$ is greater than or equal to 60 GPa.

A fourth aspect A4 includes the laminated glass article of any of A1-A3, wherein a difference between $E_C$ and $E_{CL}$ is greater than or equal to 5 GPa.

A fifth aspect A5 includes the laminated glass article of any of A1-A4, wherein the thickness $T_{CL}$ of the at least one glass clad layer is greater than or equal to 35% of the total thickness T.

A sixth aspect A6 includes the laminated glass article of any of A1-A5, wherein a core refractive index $n_C$ of the glass core layer is greater than a clad refractive index $n_{CL}$ of the at least one glass clad layer.

A seventh aspect A7 includes the laminated glass article of any of A1-A6, wherein the clad refractive index $n_{CL}$ is greater than or equal to 1.45 and less than or equal to 1.55.

An eighth aspect A8 includes the laminated glass article of any of A1-A7, wherein the at least one glass clad layer comprises a first glass clad layer and a second glass clad layer, wherein: the first glass clad layer is fused directly to a first surface of the glass core layer; and the second glass clad layer is fused directly to a second surface of the glass core layer opposite the first surface of the glass core layer.

A ninth aspect A9 includes the laminated glass article of any of A1-A8, wherein: the glass core layer has a core coefficient of thermal expansion $CTE_C$ from 20° C. temperature to 300° C.; the at least one glass clad layer has a clad coefficient of thermal expansion $CTE_{CL}$ from 20° C. to 300° C.; and $CTE_C$ is greater than or equal to $CTE_{CL}$.

A tenth aspect A10 includes the laminated glass article of any of A1-A9, wherein a surface compressive stress in the laminated glass article due to a difference between $CTE_C$ and $CTE_{CL}$ is greater than or equal to 10 MPa and less than or equal to 100 MPa.

An eleventh aspect A11 includes the laminated glass article of any of A1-A10, wherein the laminated glass article has a depth of compression due to the difference between $CTE_C$ and $CTE_{CL}$ that is greater than or equal to 20% of the total thickness T.

A twelfth aspect A12 includes the laminated glass article of any of A1-A11, wherein the glass core layer is formed from an ion exchangeable core glass composition.

A thirteenth aspect A13 includes the laminated glass article of any of A1-A12, wherein: the glass core layer is exposed at an edge of the laminated glass article; and the glass core layer comprises a surface compressive stress and depth of compression at the edge of the laminated glass article.

A fourteenth aspect A14 includes the laminated glass article of any of A1-A13, wherein the laminated glass article is ion exchange strengthened such that the laminated glass article comprises a compressive stress region due to ion exchange extending from a surface of the at least one glass clad layer and into the total thickness T of the laminated glass article to a depth of compression DOC.

A fifteenth aspect A15 includes the laminated glass article of any of A1-A14, wherein: the laminated glass article has a surface compressive stress $CS_0$ due to ion exchange at the surface of the at least one glass clad layer; and the depth of compression DOC due to ion exchange is less than or equal to 30% of the thickness $T_{CL}$ of the at least one glass clad layer.

A sixteenth aspect A16 includes the laminated glass article of any of A1-A15, wherein: the glass core layer has a core coefficient of thermal expansion $CTE_C$ from 20° C. to 300° C.; the at least one glass clad layer has a clad coefficient of thermal expansion $CTE_{CL}$ from 20° C. to 300° C.; and $CTE_C$ is greater than or equal to $CTE_{CL}$.

A seventeenth aspect A17 includes the laminated glass article of any of A1-A16, wherein a concentration of $Na_2O$ in the at least one glass clad layer decreases from a surface of the at least one glass clad layer, is a minimum at an intermediate point within a thickness of the at least one glass clad layer, and increases from the intermediate point to an interface layer between the at least one glass clad layer and the glass core layer.

An eighteenth aspect A18 includes the laminated glass article of any of A1-A17, wherein a weight gain due to ion exchange strengthening is less than 0.5%.

A nineteenth aspect A19 includes the laminated glass article of any of A1-A18, wherein the laminated glass article has a Knoop scratch initiation threshold greater than or equal to 2 N and less than or equal to 8 N.

A twentieth aspect A20 includes the laminated glass article of any of A1-A19 comprising a surface dynamic strength greater than or equal to 400 N.

A twenty-first aspect A21 includes the laminated glass article of any of A1-A20 comprising an edge dynamic strength greater than or equal to 200 N.

A twenty-second aspect A22 includes a laminated glass article comprising: a glass core layer formed from an ion exchangeable core glass composition and comprising a core refractive index $n_C$ and a core coefficient of thermal expansion $CTE_C$ from 20° C. temperature to 300° C.; and at least one glass clad layer fused directly to the glass core layer, the at least one glass clad layer formed from an ion exchangeable clad glass composition different than the ion exchangeable core glass composition, the at least one glass clad layer comprising a clad refractive index $n_{CL}$ and a clad coefficient of thermal expansion $CTE_{CL}$ from 20° C. to 300° C., wherein: the laminated glass article has a total thickness T and the at least one glass clad layer has a thickness $T_{CL}$ that is greater than or equal to 30% of the total thickness T; the core refractive index $n_C$ of the glass core layer is greater than the clad refractive index $n_{CL}$ of the at least one glass clad layer; and $CTE_C$ is greater than or equal to $CTE_{CL}$.

A twenty-third aspect A23 includes the laminated glass article of A22, wherein the clad refractive index $n_{CL}$ is greater than or equal to 1.45 and less than or equal to 1.55.

A twenty-fourth aspect A24 includes the laminated glass article of any of A22-A23, wherein a surface compressive stress in the laminated glass article due to a difference between $CTE_C$ and $CTE_{CL}$ is greater than or equal to 10 MPa and less than or equal to 100 MPa.

A twenty-fifth aspect A25 includes the laminated glass article of any of A22-A24, wherein the laminated glass article has a depth of compression due to the difference between $CTE_C$ and $CTE_{CL}$ that is greater than or equal to 20% of the total thickness T.

A twenty-sixth aspect A26 includes the laminated glass article of any of A22-A25, wherein the laminated glass article has a Knoop scratch initiation threshold greater than or equal to 2 N and less than or equal to 8 N.

A twenty-seventh aspect A27 includes the laminated glass article of any of A22-A26, wherein: the laminated glass article is ion exchange strengthened; a surface compressive stress $CS_0$ due to ion exchange at a surface of the at least one glass clad layer is greater than or equal to 200 MPa; and a depth of compression DOC due to ion exchange is less than or equal to 20% of the thickness $T_{CL}$ of the at least one glass clad layer.

A twenty-eighth aspect A28 includes the laminated glass article of any of A22-A27 comprising a surface dynamic strength greater than or equal to 400 N.

A twenty-ninth aspect A29 includes the laminated glass article of any of A22-A28 comprising an edge dynamic strength greater than or equal to 200 N.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
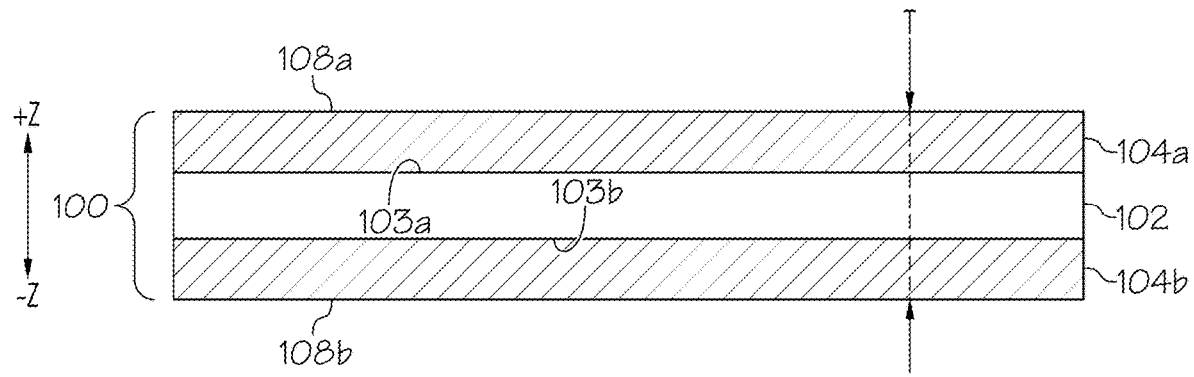
FIG. 1 schematically depicts a cross section of a laminated glass article according to one or more embodiments shown and described herein.

Reference will now be made in detail to embodiments of laminated glass articles, examples of which are illustrated in the accompanying drawings. Whenever possible, the same reference numerals will be used throughout the drawings to refer to the same or like parts. One embodiment of a laminated glass article is schematically depicted in cross section in FIG. 1, and is designated generally throughout by the reference numeral 100. The laminated glass article generally includes a glass core layer formed from core glass composition and includes a core glass elastic modulus $E_C$ and at least one glass clad layer fused directly to the glass core layer. The at least one glass clad layer may be formed from an ion exchangeable clad glass composition different than the core glass composition and includes a clad glass elastic modulus $E_{CL}$. The laminated glass article may have a total thickness T and the at least one glass clad layer may have a thickness $T_{CL}$ that is greater than or equal to 30% of the total thickness T. $E_C$ may be at least 5% greater than $E_{CL}$. Various embodiments of laminated glass articles and methods for forming the same will be described in further detail herein with specific reference to the claims.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

The term "CTE," as used herein, refers to the coefficient of thermal expansion of the glass composition averaged over a temperature range from about 20° C. to about 300° C.

The elastic modulus (also referred to as Young's modulus) of different layers of the glass laminate is provided in units of gigapascals (GPa). The elastic modulus of the glass is determined by resonant ultrasound spectroscopy on bulk samples of each glass laminate composition.

The term "softening point," as used herein, refers to the temperature at which the viscosity of the glass composition is $1 \times 10^{7.6}$ poise.

The term "annealing point," as used herein, refers to the temperature at which the viscosity of the glass composition is $1 \times 10^{13}$ poise.

The terms "strain point" and "$T_{strain}$," as used herein, refers to the temperature at which the viscosity of the glass composition is $3 \times 10^{14}$ poise.

Compressive stress (including surface compressive stress) is measured with a surface stress meter (FSM) such as commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. Depth of compression (DOC) is also measured with the FSM. The maximum central tension (CT) values are measured using a scattered light polariscope (SCALP) technique known in the art.

Concentration profiles of various constituent components in the glass, such as alkali constituent components, were measured by electron probe microanalysis (EPMA). EPMA may be utilized, for example, to discern compressive stress in the glass due to the ion exchange of alkali ions into the glass from compressive stress due to lamination.

The phrase "depth of compression" and "DOC" refer to the position in the glass where compressive stress transitions to tensile stress.

The embodiments described herein provide laminated glass articles which have high scratch resistance while also exhibiting improved resistance to drop-induced breakage. In particular, the embodiments described herein include laminated glass articles which include a glass clad layer and a glass core layer having dissimilar characteristics to facilitate different properties in the glass. Specifically, the glass clad layer has a high resistance to scratch and crack formation when subjected to sharp contacts. Further, the glasses for the glass clad layers and the glass core layer are selected to enable the development of compressive stresses to a deep depth of compression upon cool-down of the glasses following forming. In embodiments, at least the glass clad layer is also amenable to strengthening by ion exchange which may further improve the resistance of the laminated glass article to drop induced breakage. In some embodiments, the glass core layer may also be amenable to strengthening by ion exchange which facilitates strengthening at least the portions of the glass core layer exposed at the edges of the laminated glass article following separation of the laminated glass article from a sheet or ribbon of laminated glass.

Referring now to FIG. 1, a laminated glass article 100 is schematically depicted in cross section. The laminated glass article 100 generally comprises a glass core layer 102 and at least one glass clad layer 104a. In the embodiment of the laminated glass article 100 shown in FIG. 1 the laminated glass article includes a first glass clad layer 104a and a second glass clad layer 104b positioned on opposite sides of the glass core layer 102. While FIG. 1 schematically depicts the laminated glass article 100 as being a laminated glass sheet, it should be understood that other configurations and form factors are contemplated and possible. For example, the laminated glass article may have a non-planar configuration such as a curved glass sheet or the like. Alternatively, the laminated glass article may be a laminated glass tube, container, or the like.

In the embodiment of the laminated glass articles 100 described herein, the glass core layer 102 generally comprises a first major surface 103a and a second major surface 103b which is opposed to the first major surface 103a. A first glass clad layer 104a is fused to the first major surface 103a of the glass core layer 102 and a second glass clad layer 104b is fused to the second major surface 103b of the glass core layer 102.

In the embodiments described herein, the glass clad layers 104a, 104b are fused to the glass core layer 102 without any additional non-glass materials, such as adhesives, coating layers or the like, being disposed between the glass core layer 102 and the glass clad layers 104a, 104b. Thus, in some embodiments, the glass clad layers 104a, 104b are fused directly to the glass core layer 102 or are directly adjacent to the glass core layer 102.

Figure 2:
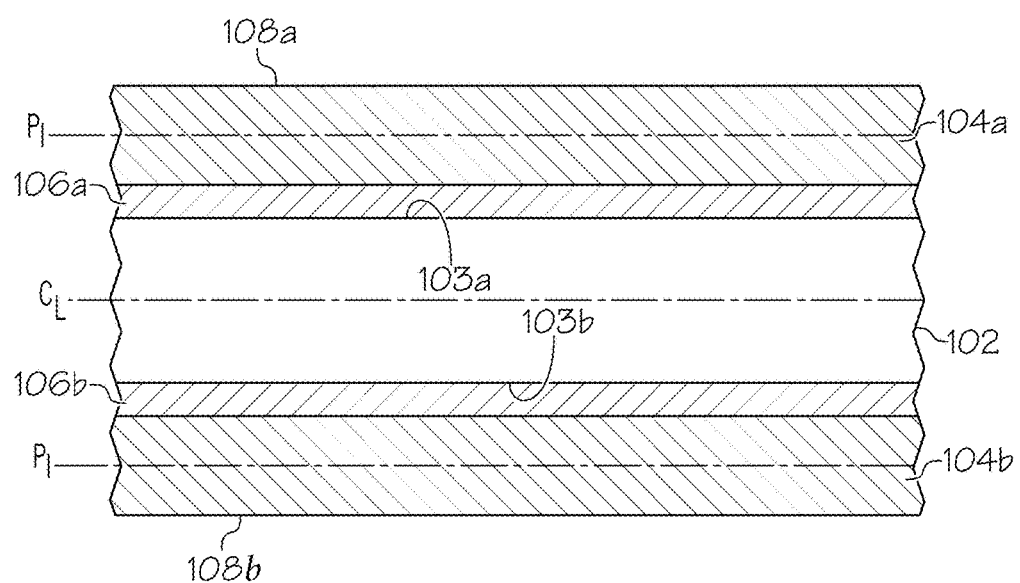
FIG. 2 schematically depicts an interface region of a laminated glass article according to one or more embodiments shown and described herein.

Referring now to FIG. 2, an enlarged view of the interface between the glass core layer 102 and the glass clad layers 104a, 104b is schematically depicted. In embodiments the laminated glass article 100 comprises interface regions 106a, 106b at the interface between the glass core layer 102 and the glass clad layers 104a, 104b. The interface regions 106a, 106b are formed when the glass core layer 102 and the glass clad layers 104a, 104b fuse together. The interface regions 106a, 106b are thin layers that consist of a mixture of the clad compositions forming the glass clad layers 104a, 104b and the core composition forming the glass core layer 102. For example, the interface regions 106a, 106b may comprise intermediate glass layers and/or diffusion layers formed at the interface of the glass core layer and the glass clad layer(s) (e.g., by diffusion of one or more components of the glass core and glass clad layers into the diffusion layer). In some embodiments, the laminated glass article 100 comprises a glass-glass laminate (e.g., an in situ fused multilayer glass-glass laminate) in which the interfaces between directly adjacent glass layers are glass-glass interfaces.

Referring again to FIG. 1, in the embodiments described herein, the laminated glass article 100 has a total thickness T which is the sum of the thickness of the glass core layer 102 and each of the glass clad layers 104a, 104b in the Z direction of the coordinate axes depicted in FIG. 1. In embodiments, the total thickness T of the laminated glass article may be greater than or equal to 0.5 mm and less than or equal to 300 mm. In some embodiments, the total thickness T of the laminated glass article may be greater than or equal to 0.8 mm and less than or equal to 1.5. In some embodiments, the total thickness T of the laminated glass article may be greater than or equal to 0.9 mm and less than or equal to 1.0 mm.

In embodiments, each glass clad layer 104a, 104b has a thickness that is greater than or equal to 30% of the total thickness T of the laminated glass article. In embodiments, the thickness of each glass clad layer 104a, 104b may be greater than or equal to 32% of the total thickness T of the laminated glass article or even greater than or equal to 33% of the total thickness T of the laminated glass article. In embodiments, the thickness of each glass clad layer 104a, 104b may be greater than or equal to 34% of the total thickness T of the laminated glass article or even greater than or equal to 35% of the total thickness T of the laminated glass article. Glass clad layers having a thickness of greater than or equal to 30% of the total thickness T of the laminated glass article aids in preventing catastrophic failure of the glass article due to the introduction of deep flaws, such as scratches or the like, in the surface of the laminated glass article. In the embodiments described herein, the composition of the glass clad layers 104a, 104b is different than the composition of the glass core layer 102 in order to achieve specific attributes in the final laminated glass article.

For example, the glass core layer 102 and the glass clad layers 104a, 104b may have different free volumes which, in turn, results in the glass core layer 102 and the glass clad layers 104a, 104b having different properties. The phrase "free volume," as used herein, refers to the space in the glass structure not occupied by atoms or structural units. Specifically, the glass clad layers 104a, 104b may have a relatively high free volume compared to the glass core layer 102. A relatively high free volume in the glass clad layers 104a, 104b results in densification of the glass during sharp impact events (i.e., scratches) and less shear which, in turn, results in less subsurface damage in the glass and less residual stress in the glass. However, a relatively high free volume in the glass does not necessarily result in improved resistance to drop-induced damage. For example, glasses with relatively high free volume generally have lower surface compression after ion exchange strengthening than glasses with relatively low free volume.

Accordingly, in the embodiments described herein, the glass core layer 102 has a lower free volume than the glass clad layers 104a, 104b. The relatively low free volume of the glass core layer 102 facilitates achieving higher compressive stresses in the glass core layer 102 when the glass core layer 102 is strengthened by ion exchange. The compressive stress in the glass core layer 102, such as at the edges of the glass core layer, improves the resistance of the laminated glass article 100 to drop-induced damage.

Based on the foregoing, a laminated glass article 100 with both improved resistance to scratching and improved resistance to drop-induced damage can be achieved by utilizing glasses with relatively high free volumes for the glass clad layers 104a, 104b and a glass with relatively lower free volume for the glass core layer 102.

The free volume of a glass is related to the elastic modulus of the glass. In particular, it is generally understood that the elastic modulus of the glass decreases with increasing free volume and increases with decreasing free volume. Accordingly, in the embodiments described herein, the glass core layer 102 has an elastic modulus $E_C$ that is greater than the elastic moduli $E_{CL}$ of the glass clad layers 104a, 104b. In some embodiments, the elastic modulus $E_C$ of the glass core layer 102 is at least 5% greater than the elastic moduli $E_{CL}$ of the glass clad layers 104a, 104b. For example, in some embodiments, the elastic modulus $E_C$ of the glass core layer 102 is at least 10% greater than the elastic moduli $E_{CL}$ of the glass clad layers 104a, 104b or even at least 15% greater than the elastic moduli $E_{CL}$ of the glass clad layers 104a, 104b. In still other embodiments, the elastic modulus $E_C$ of the glass core layer 102 is at least 20% greater than the elastic moduli $E_{CL}$ of the glass clad layers 104a, 104b or even at least 25% greater than the elastic moduli $E_{CL}$ of the glass clad layers 104a, 104b.

In some embodiments, a difference between the elastic modulus $E_C$ of the glass core layer 102 and the elastic moduli $E_{CL}$ of the glass clad layers 104a, 104b is greater than or equal to 5 GPa or even greater than or equal to 10 GPa. For example, in some of these embodiments, a difference between the elastic modulus $E_C$ of the glass core layer 102 and the elastic moduli $E_{CL}$ of the glass clad layers 104a, 104b is greater than or equal to 15 GPa or even greater than or equal to 20 GPa. In yet other embodiments, a difference between the elastic modulus $E_C$ of the glass core layer 102 and the elastic moduli $E_{CL}$ of the glass clad layers 104a, 104b is greater than or equal to 25 GPa or even greater than or equal to 30 GPa.

In some embodiments, the elastic moduli $E_{CL}$ of the glass clad layers 104a, 104b is less than or equal to 76.5 GPa and the elastic moduli $E_C$ of the glass core layer 102 is greater than 76.5 GPa. For example, in some embodiments, the elastic moduli $E_{CL}$ of the glass clad layers 104a, 104b is less than or equal to 76.5 GPa and greater than or equal to 60 GPa and the elastic moduli $E_C$ of the glass core layer 102 is greater than 76.5 GPa and less than or equal to 90 GPa. In some embodiments, the elastic moduli $E_{CL}$ of the glass clad layers 104a, 104b is less than or equal to 71.5 GPa and the elastic moduli $E_C$ of the glass core layer 102 is greater than 76.5 GPa.

Like elastic modulus, the free volume of the glass is also related to the refractive index n of the glass. In the embodiments described herein, the glass core layer 102 has a core refractive index $n_C$ that is greater than the clad refractive index $n_{CL}$ of the glass clad layers 104a, 104b. For example, in embodiments, the clad refractive index $n_{CL}$ is greater than or equal to 1.45 and less than or equal to 1.55 or even greater than or equal to 1.48 and less than or equal to 1.505. In these embodiments, the core refractive index $n_C$ is greater than or equal to 1.50 and less than or equal to 1.60 or even greater than or equal to 1.506 and less than or equal to 1.55.

Still referring to FIG. 1, in the embodiments described herein the laminated glass article 100 is formed such that there is a mismatch between the coefficients of thermal expansion (CTE) of the glass core layer 102 and the glass clad layers 104a, 104b. This mismatch in the CTEs of the glass core layer 102 and the glass clad layers 104a, 104b results in the formation of compressive stress extending from the surfaces 108a, 108b of the laminated glass article 100 into the thickness of laminated glass article. For example, in some embodiments described herein, the glass clad layers 104a, 104b are formed from glass compositions which have an average clad coefficient of thermal expansion $CTE_{CL}$ and the glass core layer 102 is formed from a different glass composition which has an average core coefficient of thermal expansion $CTE_C$. $CTE_C$ is greater than $CTE_{CL}$ (i.e., $CTE_C > CTE_{CL}$) which results in the glass clad layers 104a, 104b being compressively stressed. The resultant compressive stresses enhance the ability of the laminated glass article to withstand the introduction of surface flaws without catastrophic failure.

The compressive stress in the clad due to the CTE differential between the core and the clad may be approximated with the following equations:

$$\frac{\sigma_{clad}}{\sigma_{core}} = -\left(\frac{t_{core}}{2t_{clad}}\right) = -k;$$

$$\sigma_{clad} = \frac{(\alpha_{clad} - \alpha_{core})\Delta T}{\frac{1}{kE_{core}^{eff}} + \frac{1}{E_{clad}^{eff}} - \Delta T\left(\frac{\alpha_{core}}{kE_{core}^{eff}} + \frac{\alpha_{clad}}{E_{clad}^{eff}}\right)};$$

$$E_{core}^{eff} = \frac{E_{core}}{(1+v_{core})(1-2v_{core})};$$

$$E_{core}^{eff} = \frac{E_{clad}}{(1+v_{clad})(1-2v_{clad})};$$

Where $t_{core}$ is the core thickness, $t_{clad}$ is the clad thickness, $\alpha_{clad}$ is the clad coefficient of thermal expansion, $\alpha_{core}$ is the core coefficient of thermal expansion, $\Delta T$ is the effective temperature difference, $E_{core}$ is the elastic modulus of the core, $E_{clad}$ is the elastic modulus of the clad, $v_{core}$ is the Poisson's ratio of the core and $v_{clad}$ is the Poisson's ratio of the clad. In general $\alpha_{clad} \ll \Delta T$ and $\alpha_{core}\Delta T \ll 1$, hence:

$$\sigma_{clad} \approx \frac{(\alpha_{clad} - \alpha_{core})\Delta T}{\frac{1}{kE_{core}^{eff}} + \frac{1}{E_{clad}^{eff}}},$$

For example, in some embodiments, the glass clad layers are formed from glass compositions which have an average clad $CTE_{CL}$ less than or equal to about $72 \times 10^{-7}/°$ C. averaged over a range from 20° C. to 300° C. In some embodiments, the average clad $CTE_{CL}$ of the clad glass compositions may be less than or equal to about $70 \times 10^{-7}/°$ C. averaged over a range from 20° C. to 300° C. In yet other embodiments, the average clad $CTE_{CL}$ of the clad glass compositions may be less than or equal to about $65 \times 10^{-7}/°$ C. averaged over a range from 20° C. to 300° C. In still other embodiments, the average clad $CTE_{CL}$ of the clad glass compositions may be less than or equal to about $60 \times 10^{-7}/°$ C. averaged over a range from 20° C. to 300° C. or even less than or equal to about $55 \times 10^{-7}/°$ C. averaged over a range from 20° C. to 300° C.

However, the glass core layer may be formed from glass compositions which have an average coefficient of thermal expansion greater than $72 \times 10^{-7}/°$ C. in a range from 20° C. to 300° C. In some of these embodiments, the average core $CTE_C$ of the core glass composition of the glass core layer may be greater than or equal to about $75 \times 10^{-7}/C$ in a range from 20° C. to 300° C. In yet other embodiments, the average core $CTE_C$ of the glass composition of the glass core layer may be greater than or equal to about $80 \times 10^{-7}/°$ C. averaged over a range from 20° C. to 300° C. In yet other embodiments, the average core $CTE_C$ of the glass composition of the glass core layer may be greater than or equal to about $90 \times 10^{-7}/C$ averaged over a range from 20° C. to 300° C.

In the embodiments described herein, the CTE differential between the glass core layer 102 and the glass clad layers 104a, 104b (i.e., $|CTE_C - CTE_{CL}|$) is sufficient to generate a surface compressive stress in the clad layers. In some embodiments, the CTE differential between the glass core layer 102 and the glass clad layers 104a, 104b is sufficient to create a surface compressive stress in the glass clad layers 104a, 104b of greater than or equal to 10 MPa and less than or equal to 100 MPa which extends from a surface of the glass clad layer 104a, 104b and through the thickness of the glass clad layers 104a, 104b. That is, the compressive stress due to the CTE differential between the glass core layer 102 and the glass clad layers 104a, 104b is greater than or equal to 10 MPa and less than or equal to 100 MPa. In these embodiments, the compressive stress due to the CTE differential between the glass core layer 102 and the glass clad layers 104a, 104b extends to a depth of compression (DOC) that is greater than or equal to 20% of the total thickness T of the laminated glass article 100. For example, in some embodiments, the compressive stress due to the CTE differential between the glass core layer 102 and the glass clad layers 104a, 104b extends to a depth of compression that is greater than or equal to 22% of the total thickness T of the laminated glass article 100. In some embodiments, the compressive stress due to the CTE differential between the glass core layer 102 and the glass clad layers 104a, 104b extends to a depth of compression that is greater than or equal to 25% of the total thickness T of the laminated glass article 100.

In some embodiments the CTE differential between the glass core layer and the glass clad layers is greater than or equal to about $5 \times 10^{-7}/°$ C. or even $10 \times 10^{-7}/°$ C. In some other embodiments, the CTE differential between the glass core layer and the glass clad layers is greater than or equal to about $20 \times 10^{-7}/°$ C. or even $30 \times 10^{-7}/°$ C. In yet other embodiments, the CTE differential between the glass core layer and the glass clad layers is greater than or equal to about $40 \times 10^{-7}/°$ C. or even $50 \times 10^{-7}/°$ C.

In the embodiments described herein, the glass clad layers 104a, 104b may be formed from an ion exchangeable clad glass composition. In some of these embodiments, the glass core layer 102 is formed from an ion exchangeable core glass composition and the glass clad layers 104a, 104b are formed from an ion exchangeable clad glass composition. In these embodiments, the ion exchangeable core glass composition and the ion exchangeable clad glass composition may both comprise $Li_2O$ and $Na_2O$ to facilitate ion exchange strengthening of the respective layers. Ion exchange strengthening of the glass clad layers 104a, 104b, when performed, may further improve the resistance of the laminated glass article 100 to failure due to flaws introduced in the surface of the laminated glass article. Similarly, ion exchange strengthening of the glass core layer 102, when performed, particularly ion exchange strengthening of the glass core layer 102 exposed at the edges of the laminated glass article 100 following separation of the laminated glass article 100 from a sheet or ribbon of laminated glass, eliminates exposed tension at the edges and further improves the resistance of the laminated glass article 100 to failure at the edges.

Accordingly, it should be understood that, in some embodiments, the laminated glass article 100 may also be strengthened by ion exchange to further enhance the properties of the laminated glass article 100. The combination of a CTE differential between the glass core layer 102 and the glass clad layers 104a, 104b and ion exchange strengthening creates a unique stress profile. Specifically, the stress profile in the laminated glass article 100 following ion exchange is the sum of the stress profile due to the CTE differential between the glass clad layer and the glass core layer and the stress profile due to ion exchange. In embodiments, the compressive stress in the region from the surface of the glass to a depth from the surface that is about 20% or even 30% of the thickness of the glass clad layer includes both compressive stresses due to the CTE differential between the glass core layer and the glass clad layer as well as compressive stresses due to ion exchange strengthening. That is, the compressive stress due to ion exchange extends to a depth of compression that is about 20% or even 30% of the thickness of each the glass clad layers 104a, 104b.

More specifically, in some embodiments the glass clad layers 104a, 104b and, optionally, the glass core layer 102 may be formed from glass compositions which can be strengthened by ion exchange. The presence of alkali oxides in the glass core layer 102 and the glass clad layers 104a, 104b facilitate strengthening the glass by ion exchange. Specifically, alkali ions, such as potassium ions, sodium ions, lithium ions and the like, are sufficiently mobile in the glass to facilitate ion exchange. Strengthening of the laminated glass article by ion exchange may be accomplished by treating the laminated glass article 100 in a salt bath of molten $KNO_3$, molten $NaNO_3$, or combinations thereof at temperatures from 350° C. to 500° C. for a time period of less than about 30 hours or even about less than 20 hours.

In embodiments where the laminated glass article 100 is strengthened by ion exchange, the laminated glass article has a surface compressive stress $CS_0$ due to ion exchange and a compressive stress region due to ion exchange that extends from the surfaces 108a, 108b of the laminated glass article 100 and into the total thickness T to a depth of compression DOC. In some of these embodiments, the surface compressive stress due to ion exchange is greater than or equal to 200 MPa or even greater than or equal to 500 MPa. In some of these embodiments, the surface compressive stress due to ion exchange may be greater than or equal to 600 MPa or even greater than or equal to 700 MPa.

In some embodiments, the depth of compression due to ion exchange is less than or equal to 30% of the thickness of the glass clad layer in which the compressive stress is formed due to ion exchange. In some embodiments, the depth of compression due to ion exchange is less than or equal to 20% of the thickness of the glass clad layer in which the compressive stress is formed due to ion exchange. In some embodiments, the depth of compression due to ion exchange is less than or equal to 15% of the thickness of the glass clad layer in which the compressive stress is formed due to ion exchange. In some embodiments, the depth of compression due to ion exchange is less than or equal to 10% of the thickness of the glass clad layer in which the compressive stress is formed due to ion exchange.

In embodiments where the laminated glass article is separated from a continuous ribbon of glass, the separation may expose the glass core layer and the central tension in the glass core layer along at least one edge of the laminated glass article, as noted hereinabove. In embodiments where the laminated glass article comprises a glass core layer formed from an ion exchangeable glass, the exposed edge of the laminated glass article with the exposed central tension may be ion exchange strengthened to produce compressive stress in the surface of the exposed glass core layer extending to a depth of compression. The surface compressive stress in the exposed glass core layer eliminates the central tension at the exposed edge and reduces the risk of failure of the laminated glass article from the exposed edge. In these embodiments, the laminated glass article may have surface compressive stresses along the entire exposed edge (i.e., in the glass clad layers and the glass core layer).

In embodiments where compressive stress is introduced into the laminated glass article through both lamination and ion exchange, the combination of lamination with ion exchange shortens the ion exchange time needed to reach a specified depth of compression and/or surface compressive stress at a given ion exchange temperature. More specifically, forming a laminated glass article from a glass core layer and one or more glass clad layers having a CTE differential between the glass core layer and the glass clad layer results in a glass article with a surface compressive stress extending into the total thickness of the glass article to a depth of compression. Because the laminated glass article has an existing surface compressive stress and depth of compression prior to ion exchange strengthening, the time required to achieve a particular surface compressive stress or depth of compression through ion exchange may be reduced.

The reduced ion exchange time due to the existing surface compressive stress minimizes weight gain in the glass substrate due to ion exchange. Specifically, ion exchange strengthening is achieved by exchanging smaller (and lighter) ions in the glass network with larger (and heavier) ions from the molten salt bath. However, because the glass cladding layers have an existing surface compressive stress, fewer ion exchange events (i.e., the exchange of a smaller ion in the glass for a larger ion from the molten salt bath) are required to achieve a desired increase in the surface compressive stress. Thus, a laminated glass article with an existing surface compressive stress due to lamination gains less weight during the ion exchange to achieve the same surface compressive stress as the same laminated glass article without an existing surface compressive stress profile (or a glass article formed from the clad glass composition alone and without an existing surface compressive stress profile).

In the embodiments described herein, the laminated glass articles have a weight gain of less than 0.5% due to ion exchange strengthening. In some embodiments, the laminated glass articles have a weight gain of less than 0.4% due to ion exchange strengthening. In some embodiments, the laminated glass articles have a weight gain of less than 0.3% due to ion exchange strengthening. In some embodiments, the laminated glass articles have a weight gain of less than 0.2% due to ion exchange strengthening.

Referring again to FIG. 2, prior to ion exchange strengthening, the concentration of various constituent components of the glass network (e.g., glass formers such as $SiO_2$ and $B_2O_3$, intermediates such as $Al_2O_3$, and modifiers such as CaO, $Na_2O$, etc.) of the glass clad layers 104a, 104b are generally uniformly distributed from the surfaces 108a, 108b of the laminated glass article 100 to the respective interface regions 106a, 106b. For example, the glass clad layers 104a, 104b comprise at least one glass former and a concentration of the glass former is substantially constant from the surfaces 108a, 108b of the laminated glass article 100 to the clad side of the interface regions 106a, 106b. In addition, the glass clad layers 104a, 104b comprise at least one modifier, such as $Na_2O$ and/or another alkali oxide, and a concentration of the modifier is substantially constant from the surfaces 108a, 108b of the laminated glass article 100 to the clad side of the interface regions 106a, 106b.

However, after ion exchange, the concentration of the alkali oxides, such as $K_2O$ and/or $Na_2O$, varies in at least the glass clad layers 104a, 104b as a function of depth from the surfaces 108a, 108b of the laminated glass article 100. For example, in embodiments where the laminated glass article comprises $Na_2O$ and the laminated glass article is ion exchanged in a molten salt bath comprising sodium ions, such as a molten salt bath comprising $NaNO_3$, a concentration of $Na_2O$ decreases from the surfaces 108a, 108b of the laminated glass article 100 to an intermediate point $P_I$ in the thickness of the glass clad layers 104a, 104b, is a minimum at the intermediate point $P_I$, and increases from the intermediate point $P_I$ to the clad side of the interface regions 106a, 106b. That is, the concentration of $Na_2O$ in the glass clad layers 104a, 104b varies as a function of distance from the surfaces 108a, 108b.

While the concentration of alkali oxides in the glass clad layers changes as a result of ion exchange strengthening, it should be understood that the concentrations of the other constituents of the glass network (i.e., glass formers, intermediates, and non-mobile modifiers such as alkaline earth oxides (CaO, MgO, etc.)) remain substantially the same (i.e., substantially uniform through the thicknesses of the glass clad layers and substantially uniform through the thickness of the glass core layer).

In some embodiments, the glass core layer may be formed from one of the ion exchangeable core glass compositions listed in Table 1A and Table 1B below. However, it should be understood that other compositions for the glass core layer 102 are contemplated and possible.

TABLE 1A

Example Glass Core Layer Compositions

| Analyzed composition in mol % | C1 | C2 | C3 | C4 | C5 | C6 | C7 |
|---|---|---|---|---|---|---|---|
| $SiO_2$ | 61.39 | 61.34 | 61.38 | 61.44 | 61.24 | 61.34 | 61.29 |
| $Al_2O_3$ | 16.33 | 16.26 | 16.29 | 16.26 | 16.32 | 16.34 | 16.31 |
| $B_2O_3$ | 0.00 | 1.46 | 0.96 | 0.56 | 0.00 | 1.16 | 0.00 |
| $P_2O_5$ | 2.92 | 0.00 | 0.00 | 0.00 | 0.00 | 0.00 | 0.00 |
| $Li_2O$ | 8.31 | 8.40 | 8.33 | 8.22 | 8.32 | 8.35 | 8.31 |
| $Na_2O$ | 11.00 | 8.95 | 8.96 | 9.01 | 9.03 | 9.00 | 9.01 |
| MgO | 0.00 | 3.54 | 4.03 | 4.46 | 5.04 | 3.53 | 4.80 |
| $ZrO_2$ | 0.00 | 0.00 | 0.00 | 0.00 | 0.00 | 0.23 | 0.23 |
| $SnO_2$ | 0.05 | 0.05 | 0.05 | 0.05 | 0.05 | 0.05 | 0.05 |
| Density (g/cm$^3$) | 2.42 | 2.442 | 2.448 | 2.451 | 2.46 | 2.45 | 2.465 |
| FE Strain Pt. (° C.) | 565 | 545 | 548 | 552 | 558 | 550 | 563 |
| FE Anneal Pt. (° C.) | 614 | 595 | 594 | 598 | 604 | 597 | 610 |
| FE Softening Pt. (° C.) | 855 | 813.8 | | 821 | | 823 | 829.2 |
| CTE *10$^{-7}$ (1/° C.) | 84.9 | 75.9 | 75.8 | 75.4 | 75.8 | 76 | 75.1 |
| liquidus visc Air (Poise) | 405172 | 73576 | 64692 | 45793 | 23978 | 57235 | 39445 |
| liquidus visc Int (Poise) | 405172 | 73576 | 70986 | 54805 | 28463 | 62764 | 47317 |
| liquidus visc Pt (Poise) | 450632 | 98103 | 85719 | 65831 | 40554 | 75696 | 62631 |
| Stress Optical Coefficient (nm/mm/MPa) | 2.922 | 2.878 | 2.828 | 2.797 | 2.763 | 2.86 | 2.782 |
| Refractive Index | 1.5063 | 1.5167 | 1.5175 | 1.5186 | 1.5199 | 1.518 | 1.5208 |
| Elastic Modulus (GPa) | 76.7 | 81.3 | 82.6 | 82.8 | 83.6 | 82.3 | 84.0 |
| Poisson's Ratio | 0.211 | 0.21 | 0.22 | 0.22 | 0.22 | 0.22 | 0.22 |

TABLE 1B

Example Glass Core Layer Compositions

| Analyzed composition mol % | C8 | C9 | C10 | C11 | C12 | C13 |
|---|---|---|---|---|---|---|
| $SiO_2$ | 60.32 | 59.80 | 60.49 | 59.77 | 60.35 | 59.79 |
| $Al_2O_3$ | 16.40 | 16.34 | 16.28 | 16.34 | 16.36 | 16.32 |
| $B_2O_3$ | 1.47 | 1.46 | 0.98 | 0.97 | 0.49 | 0.49 |

TABLE 1B-continued

Example Glass Core Layer Compositions

| Analyzed composition mol % | C8 | C9 | C10 | C11 | C12 | C13 |
|---|---|---|---|---|---|---|
| $P_2O_5$ | 0.99 | 1.49 | 0.98 | 1.49 | 0.99 | 1.48 |
| $Li_2O$ | 8.29 | 8.43 | 8.31 | 8.41 | 8.31 | 8.34 |
| $Na_2O$ | 8.94 | 8.91 | 8.94 | 8.91 | 8.95 | 8.97 |
| MgO | 3.53 | 3.53 | 3.97 | 4.06 | 4.50 | 4.56 |
| $SnO_2$ | 0.06 | 0.05 | 0.05 | 0.05 | 0.06 | 0.05 |
| Density (g/cm³) | 2.438 | 2.436 | 2.444 | 2.443 | 2.45 | 2.449 |
| FE Strain Pt. (° C.) | 546 | 557 | 551 | 565 | 563 | 573 |
| FE Anneal Pt. (° C.) | 591 | 604 | 597 | 611 | 609 | 619 |
| FE Softening Pt. (° C.) | 861 | 859 | 864 | 858 | 851 | 864 |
| CTE *10⁻⁷ (1/° C.) | 78.6 | 79.2 | 78.6 | 79.8 | 78.4 | 79 |
| Stress Optical Coefficient (nm/mm/MPa) | 2.891 | 2.919 | 2.866 | 2.874 | 2.833 | 2.861 |
| Refractive Index | 1.5149 | 1.5149 | 1.5164 | 1.5148 | 1.5169 | 1.5157 |
| Elastic Modulus (GPa) | 80.53 | 80.32 | 81.56 | 81.01 | 82.46 | 82.05 |
| Poisson's Ratio | 0.218 | 0.224 | 0.225 | 0.226 | 0.226 | 0.224 |

In some embodiments, the glass clad layers may be formed from one or more of the ion exchangeable clad glass compositions listed in Table 2A and Table 2B below. However, it should be understood that other compositions for the glass clad layers 104a, 104b are contemplated and possible.

TABLE 2A

Example Clad Glass Compositions

| Analyzed composition in mol % | CL1 | CL2 | CL3 | CL4 | CL5 | CL6 |
|---|---|---|---|---|---|---|
| $SiO_2$ | 73.56 | 60.26 | 64.31 | 62.40 | 66.21 | 68.22 |
| $Al_2O_3$ | 7.51 | 15.22 | 13.25 | 14.25 | 12.22 | 11.23 |
| $B_2O_3$ | 6.72 | 9.78 | 9.73 | 9.72 | 9.74 | 9.69 |
| $P_2O_5$ | 2.45 | 0.00 | 0.00 | 0.00 | 0.00 | 0.00 |
| $Li_2O$ | 5.88 | 5.79 | 3.81 | 5.69 | 3.86 | 3.87 |
| $Na_2O$ | 3.83 | 8.90 | 8.86 | 7.90 | 7.92 | 6.94 |
| MgO | 0.00 | 0.00 | 0.00 | 0.00 | 0.00 | 0.00 |
| $ZrO_2$ | 0.00 | 0.00 | 0.00 | 0.00 | 0.00 | 0.00 |
| $SnO_2$ | 0.05 | 0.05 | 0.05 | 0.05 | 0.05 | 0.05 |
| Density (g/cm³) | 2.281 | 2.358 | 2.338 | 2.346 | 2.326 | 2.312 |
| FE Strain Pt. (° C.) | 498 | 512 | 521 | 513 | 516 | 514 |
| FE Anneal Pt. (° C.) | 545 | 559 | 571 | 561 | 565 | 566 |
| FE Softening Pt. (° C.) | 825.2 | 809.6 | 833.3 | 818.9 | 834.5 | 845.1 |
| CTE *10⁻⁷ (1/° C.) | 49.6 | 70.3 | 64.8 | 66.3 | 62.5 | 58.4 |
| liquidus vise Air (Poise) | 202940 | 386760 | 9359791 | 415386 | 10843312 | 7819746 |
| liquidus vise Int (Poise) | 220335 | 386760 | 10695950 | 460429 | 12292910 | 7819746 |
| liquidus vise Pt (Poise) | 283326 | 601919 | 10695950 | 460429 | 9576418 | 8799692 |
| Stress Optical Coefficient (nm/mm/MPa) | 3.579 | 3.398 | 3.523 | 3.444 | 3.571 | 3.617 |

TABLE 2A-continued

Example Clad Glass Compositions

| Analyzed composition in mol % | CL1 | CL2 | CL3 | CL4 | CL5 | CL6 |
|---|---|---|---|---|---|---|
| Refractive Index | 1.4844 | 1.5042 | 1.4965 | 1.5009 | 1.4945 | 1.4924 |
| Elastic Modulus (GPa) | 67.8 | 69.6 | 67.1 | 69.3 | 67.1 | 66.5 |
| Poisson's Ratio | 0.201 | 0.226 | 0.22 | 0.219 | 0.223 | 0.219 |

TABLE 2B

Example Clad Glass Compositions

| Analyzed composition in mol % | CL7 | CL8 | CL9 | CL10 | CL11 | CL12 | CL13 |
|---|---|---|---|---|---|---|---|
| $SiO_2$ | 70.20 | 66.37 | 66.42 | 66.40 | 66.48 | 66.42 | 66.50 |
| $Al_2O_3$ | 10.22 | 12.57 | 12.56 | 12.57 | 12.57 | 12.54 | 12.59 |
| $B_2O_3$ | 9.71 | 7.23 | 7.19 | 7.19 | 7.15 | 7.17 | 7.08 |
| $P_2O_5$ | 0.00 | 0.00 | 0.00 | 0.00 | 0.00 | 0.00 | 0.00 |
| $Li_2O$ | 3.82 | 6.84 | 6.83 | 6.83 | 6.74 | 6.84 | 6.74 |
| $Na_2O$ | 6.00 | 5.36 | 4.85 | 4.37 | 3.89 | 3.39 | 2.90 |
| MgO | 0.00 | 1.58 | 2.10 | 2.60 | 3.11 | 3.59 | 4.15 |
| $ZrO_2$ | 0.00 | 0.00 | 0.00 | 0.00 | 0.00 | 0.00 | 0.00 |
| $SnO_2$ | 0.05 | 0.05 | 0.05 | 0.05 | 0.05 | 0.05 | 0.05 |
| Density (g/cm$^3$) | 2.297 | 2.349 | 2.349 | 2.35 | 2.35 | 2.352 | 2.353 |
| FE Strain Pt. (° C.) | 514 | 523 | 532 | 543 | 542 | 548 | 556 |
| FE Anneal Pt. (° C.) | 568 | 567 | 577 | 590 | 590 | 596 | 604 |
| FE Softening Pt. (° C.) | 855.8 | 815.2 | 828.3 | 832 | 832 | 837 | 843.1 |
| CTE *$10^{-7}$ (1/° C.) | 54.2 | 58.1 | 55.5 | 54 | 51.3 | 49.9 | 48.2 |
| liquidus visc Air (Poise) | 11457230 | 120189 | 86244 | 60763 | 78774 | 54016 | 52905 |
| liquidus visc Int (Poise) | 10112360 | 131666 | 113084 | 78900 | 94495 | 70575 | 68985 |
| liquidus visc Pt (Poise) | 12998844 | 158438 | 123998 | 94303 | 113768 | 84730 | 99542 |
| Stress Optical Coefficient (nm/mm/MPa) | 3.703 | 3.322 | 3.312 | 3.305 | 3.289 | 3.288 | 3.261 |
| Refractive Index | 1.4902 | 1.5025 | 1.5029 | 1.5035 | 1.504 | 1.5048 | 1.5054 |
| Elastic Modulus (GPa) | 65.8 | 73.2 | 73.6 | 74.2 | 74.5 | 75.3 | 76.3 |
| Poisson's Ratio | 0.214 | 0.214 | 0.213 | 0.214 | 0.214 | 0.215 | 0.219 |

A variety of processes may be used to produce the laminated glass articles described herein including, without limitation, lamination slot draw processes, lamination float processes, or fusion lamination processes. Each of these lamination processes generally involves flowing a first molten glass composition, flowing a second molten glass composition, and contacting the first molten glass composition with the second molten glass composition at a temperature greater than the glass transition temperature of either glass composition to form an interface between the two compositions such that the first and second molten glass compositions fuse together at the interface as the glass cools and solidifies.

Figure 3:
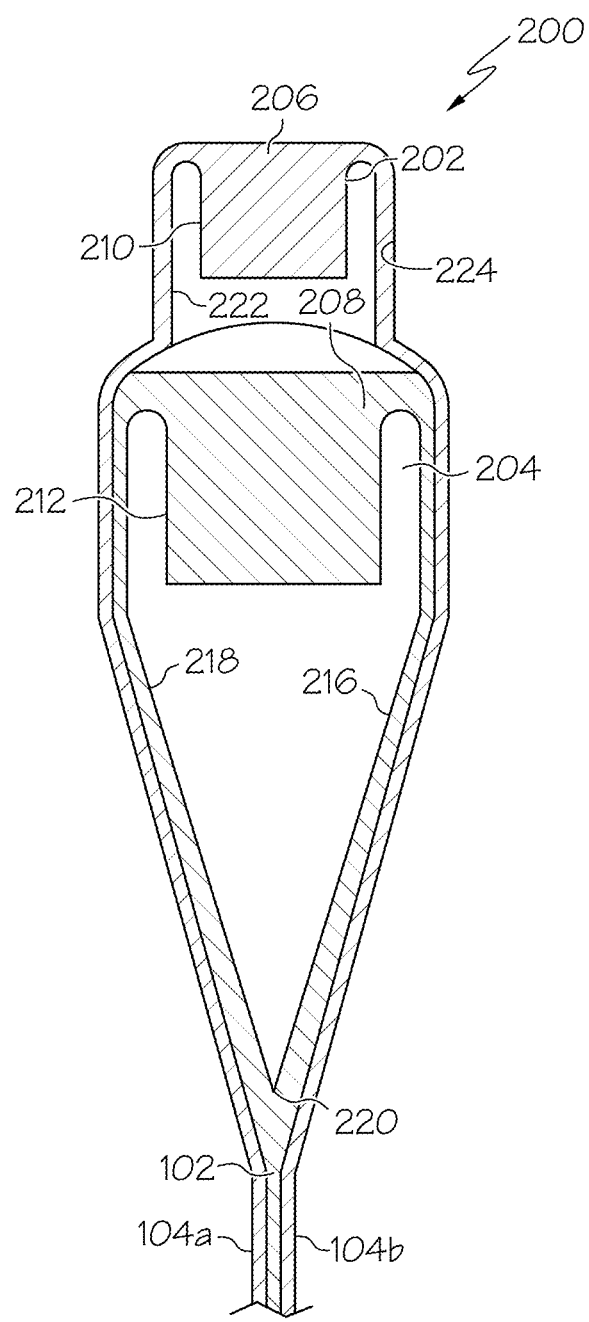
FIG. 3 schematically depicts an apparatus for forming a laminated glass article according to one or more embodiments shown and described herein.

In one particular embodiment, the laminated glass articles 100 described herein may be formed by a fusion lamination process such as the process described in U.S. Pat. No. 4,214,886, which is incorporated herein by reference. Referring to FIG. 3 by way of example, a laminate fusion draw apparatus 200 for forming a laminated glass article includes an upper overflow distributor or isopipe 202 which is positioned over a lower overflow distributor or isopipe 204. The upper overflow distributor 202 includes a trough 210 into which a molten glass clad composition 206 is fed from a melter (not shown). Similarly, the lower overflow distributor 204 includes a trough 212 into which a molten glass core composition 208 is fed from a melter (not shown).

As the molten glass core composition 208 fills the trough 212, it overflows the trough 212 and flows over the outer forming surfaces 216, 218 of the lower overflow distributor 204. The outer forming surfaces 216, 218 of the lower overflow distributor 204 converge at a root 220. Accordingly, the molten glass core composition 208 flowing over the outer forming surfaces 216, 218 rejoins at the root 220 of the lower overflow distributor 204 thereby forming a glass core layer 102 of a laminated glass article.

Simultaneously, the molten glass clad composition 206 overflows the trough 210 formed in the upper overflow distributor 202 and flows over outer forming surfaces 222, 224 of the upper overflow distributor 202. The molten glass clad composition 206 is outwardly deflected by the upper overflow distributor 202 such that the molten glass clad composition 206 flows around the lower overflow distributor 204 and contacts the molten glass core composition 208 flowing over the outer forming surfaces 216, 218 of the lower overflow distributor, fusing to the molten glass core composition and forming glass clad layers 104a, 104b around the glass core layer 102.

While FIG. 3 schematically depicts a particular apparatus for forming planar laminated glass articles such as sheets or ribbons, it should be appreciated that other geometrical configurations are possible. For example, cylindrical laminated glass articles may be formed, for example, using the apparatuses and methods described in U.S. Pat. No. 4,023,953.

In the embodiments described herein, the molten glass core composition 208 generally has an average core coefficient of thermal expansion $CTE_C$ which is greater than the average clad coefficient of thermal expansion $CTE_{CL}$ of the molten glass clad composition 206, as described herein above. Accordingly, as the glass core layer 102 and the glass clad layers 104a, 104b cool, the difference in the coefficients of thermal expansion of the glass core layer 102 and the glass clad layers 104a, 104b cause a compressive stresses to develop in the glass clad layers 104a, 104b. The compressive stress increases the strength of the resulting laminated glass article.

Knoop scratch thresholds (KST) described herein are determined using a Knoop diamond indenter. The scratch threshold is determined by first identifying the load range for lateral crack onset Once the load range is identified, a series of 5 mm long scratches under increasing constant load with three or more scratches per load are generated at a speed of 4 mm/s in order to identify the Knoop scratch threshold. Lateral cracks are defined as sustained cracks that are larger than twice the width of the groove.

In the embodiments described herein, the glass laminates have Knoop scratch thresholds greater than or equal to 2 Newtons (N). In some embodiments the glass laminates have Knoop scratch thresholds greater than or equal to 4 N or even greater than or equal to 6 N. In embodiments, the glass laminates described herein have Knoop scratch thresholds of greater than or equal to 2 N and less than or equal to 8 N or even greater than or equal to 4 N and less than or equal to 8 N. In some of these embodiments, the glass laminates described herein have Knoop scratch thresholds of greater than or equal to 2 N and less than or equal to 4 N or even greater than or equal to 4 N and less than or equal to 6 N. In still other embodiments, the glass laminates described herein have Knoop scratch thresholds of greater than or equal to 6 N and less than or equal to 8 N.

In the embodiments described herein, the resistance of the laminated glass article to failure under dynamic loading conditions may be determined by surface dynamic impact testing. Surface dynamic impact testing includes impinging a disk of 30 grit SiC sandpaper against a surface of the laminated glass article at a predetermined velocity. The laminated glass article (i.e., the sample) is held in a fixture during impact and the force of the impact is measured with a piezoelectric load cell attached to the laminated glass article. The impact force resulting in failure of the laminated glass article is considered the surface dynamic strength of the laminated glass article.

Specifically, a 1 inch disk of 30 grit SiC sandpaper is affixed to the end of a piston that is held in a frictionless air bearing. The piston and air bearing are contained within a test vehicle that is propelled by a variable speed belt slide. The glass sample is affixed to a piezoelectric load cell situated at the end of the belt slide. The test vehicle is propelled towards the sample by the belt slide and, at the end of the belt slide, the vehicle is rapidly decelerated causing the piston to be propelled forward by momentum. The piston and, more specifically, the sandpaper affixed to the end of the piston, strikes the surface of the glass at the center of the glass sample, and freely rebounds on the air bearing. The actual velocity of the piston prior to impact is measured by a pair of photogates. The force of impact is recorded by the piezoelectric sensor.

In the embodiments described herein, the laminated glass articles have a surface dynamic strength that is greater than or equal to 400 Newtons (N). In some embodiments, the laminated glass articles have a surface dynamic strength of greater than or equal to 500 N or even greater than or equal to 600 N. In some embodiments, the laminated glass articles have a surface dynamic strength of greater than or equal to 700 N or even greater than or equal to 800 N. In some embodiments, the laminated glass articles have a surface dynamic strength of greater than or equal to 900 N or even greater than or equal to 1000 N. In some embodiments, the laminated glass articles have a surface dynamic strength of greater than or equal to 1000 N or even greater than or equal to 1200 N. In embodiments, the laminated glass articles have a surface dynamic strength of greater than or equal to 400 N and less than or equal to 1200 N. In embodiments, the laminated glass articles have a surface dynamic strength of greater than or equal to 500 N and less than or equal to 1100 N. In embodiments, the laminated glass articles have a surface dynamic strength of greater than or equal to 500 N and less than or equal to 1000 N. In embodiments, the laminated glass articles have a surface dynamic strength of greater than or equal to 500 N and less than or equal to 900 N. In embodiments, the laminated glass articles have a surface dynamic strength of greater than or equal to 600 N and less than or equal to 800 N.

In the embodiments described herein, the resistance of the laminated glass article to failure from the edge of the article under dynamic loading conditions may be determined by edge dynamic impact testing. Edge dynamic impact testing includes impinging a tungsten carbide (WC) rod against an edge of the laminated glass article at a predetermined velocity. At impact, the long axis of the WC rod is perpendicular to the surface of the laminated glass article. The laminated glass article (i.e., the sample) is held in a fixture during impact and the force of the impact is measured with a piezoelectric load cell attached to the laminated glass article. The impact force incident on the edge of the laminated glass article and resulting in failure of the laminated glass article is considered the edge dynamic strength of the laminated glass article.

Specifically, a ⅜ inch WC rod is affixed to the end of a piston that is held in a frictionless air bearing. The piston and air bearing are contained within a test vehicle that is propelled by a variable speed belt slide. The glass sample is affixed to a piezoelectric load cell situated at the end of the belt slide. The test vehicle is propelled towards the sample by the belt slide and, at the end of the belt slide, the vehicle is rapidly decelerated causing the piston to be propelled forward by momentum. The piston and, more specifically, the WC rod affixed to the end of the piston, strikes the edge of the glass sample, and freely rebounds on the air bearing.

The actual velocity of the piston prior to impact is measured by a pair of photogates. The force of impact is recorded by the piezoelectric sensor.

In the embodiments described herein, the laminated glass articles have an edge dynamic strength that is greater than or equal to 200 Newtons (N) prior to ion exchange. In some embodiments, the laminated glass articles have an edge dynamic strength of greater than or equal to 300 N or even greater than or equal to 400 N prior to ion exchange. In embodiments, the laminated glass articles have an edge dynamic strength of greater than or equal to 200 N and less than or equal to 500 N prior to ion exchange. In embodiments, the laminated glass articles have an edge dynamic strength of greater than or equal to 300 N and less than or equal to 500 N prior to ion exchange. In embodiments, the laminated glass articles have an edge dynamic strength of greater than or equal to 300 N and less than or equal to 500 N prior to ion exchange.

In the embodiments described herein, the laminated glass articles have an edge dynamic strength that is greater than or equal to 500 Newtons (N) after ion exchange. In some embodiments, the laminated glass articles have an edge dynamic strength of greater than or equal to 500 N or even greater than or equal to 600 N after ion exchange. In some embodiments, the laminated glass articles have an edge dynamic strength of greater than or equal to 700 N or even greater than or equal to 800 N after ion exchange. In embodiments, the laminated glass articles have an edge dynamic strength of greater than or equal to 500 N and less than or equal to 900 N after ion exchange. In embodiments, the laminated glass articles have an edge dynamic strength of greater than or equal to 600 N and less than or equal to 800 N after ion exchange. In embodiments, the laminated glass articles have an edge dynamic strength of greater than or equal to 700 N and less than or equal to 800 N after ion exchange.

The laminated glass articles described herein can be useful in a variety of applications including, for example, auto-glazing, architectural, appliance, and consumer electronics (e.g., cover glass) applications. The combination of thin, ion exchangeable glass clad layers with relatively low elastic moduli with an ion exchangeable glass core layer with a relatively high elastic moduli provides the laminated glass articles with improved resistance to surface damage, such as scratching, and also with improved resistance to sharp impact damage, such as drop-induced damage and breakage.

EXAMPLES

The embodiments described herein will be further clarified by the following examples.

Example 1

A three-layered laminated glass article was formed with core glass composition C1 (Table 1) and clad glass composition CL (Table 2A). The glass clad layers had a thickness from about 200 μm to about 250 μm. The glass core layer had a thickness of approximately 300 μm. The elastic modulus of the glass core layer was 76.67 GPa and the CTE was $84 \times 10^{-7}/°$ C. The elastic modulus of the glass clad layers was 67.78 GPa and the CTE was $49.6 \times 10^{-7}/°$ C. Based on the values of the elastic moduli, Poisons ratio, and CTE for each glass, the compressive stress in the glass clad layers due to the CTE mismatch between the glass clad layers and the glass core layers was determined to be approximately 66 MPa. For purposes of this calculation, ΔT was estimated to be the difference between the lower strain point temperature and room temperature.

Samples of the laminated glass article were ion exchange strengthened by immersing the samples in a molten salt bath of 20 wt. % $NaNO_3$/80 wt. % $KNO_3$ at a temperature of 390° C. for either 0.5 hours, 2 hours, 4 hours, 7.5 hours, or 16 hours. The samples were weighed before and after the ion exchange treatment to determine the change in weight due to ion exchange. The samples were also qualitatively inspected to determine if the ion exchange process resulted in any warp or other distortions in the glass. None of the samples had any observable warp or distortion.

Following ion exchange strengthening, the compressive stress (CS) and depth of compression were determined with a fundamental stress meter (FSM) instrument. The sample ion exchanged for 2 hours had a surface compressive stress of approximately 390 MPa and a depth of compression of approximately 7 μm. The sample ion exchanged for 4 hours had a surface compressive stress of approximately 415 MPa and a depth of compression of approximately 10 μm. The sample ion exchanged for 7.5 hours had a surface compressive stress of approximately 385 MPa and a depth of compression of approximately 12.5 μm. The sample ion exchanged for 16 hours had a surface compressive stress of approximately 360 MPa and a depth of compression of approximately 21 μm. This data generally indicates that ion exchange further increased the compressive stress at the surfaces of the laminated glass articles. It is believed that this increase in the surface compressive stress will further enhance the ability of the laminated glass articles to withstand flaws introduced at the surface without failure.

Figure 4:
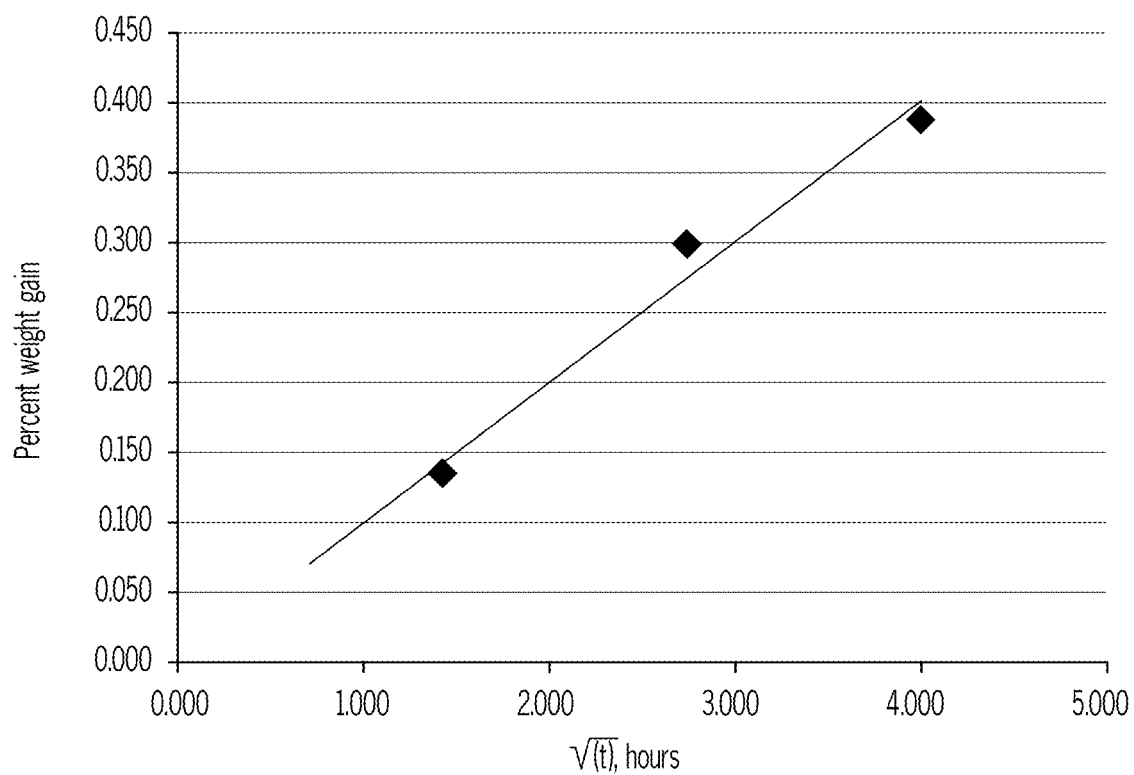
FIG. 4 graphically depicts the weight gain (Y-ordinate) as a function of the square root of the ion exchange time (X-ordinate) for laminated glass articles ion exchanged at different times.

Referring now to FIG. 4, the percentage of weight gain in the samples following ion exchange strengthening is plotted as a function of the square root of the ion exchange time. FIG. 4 generally shows that, after ion exchange strengthening, all the samples of the laminated glass article had a weight gain of less than 0.4%. The lack of observable warp or distortion is believed to be due to the low weight gain. In addition, the data in FIG. 4, taken with the FSM data, indicates that an advantageous stress profile can be obtained in the samples with a corresponding low amount of lithium ion poisoning in the molten salt bath.

Specifically, the glass clad layers and the glass core layer contained lithium ions (from $Li_2O$) that were exchanged with sodium and potassium ions in the molten salt bath resulting in an increase in the surface compressive stress in the glass clad layers, as noted above. The weight gain data indicates that the increase in surface compressive stress was achieved with relatively few $Li^+$—$Na^+$ or $Li^+$—$K^+$ exchange events, resulting in the relatively low weight gain. As such, a relatively low amount of lithium was removed from the glass, resulting in relatively low lithium ion poisoning in the molten salt bath.

While not wishing to be bound by theory, it is believed that the increase in surface compressive stress in the samples following a relatively short ion exchange time, and with a corresponding relatively low weight gain, relatively low bath poisoning, and no observable warp or distortion, is attributable to the pre-existing compressive stress in the samples due to lamination.

Figure 5:
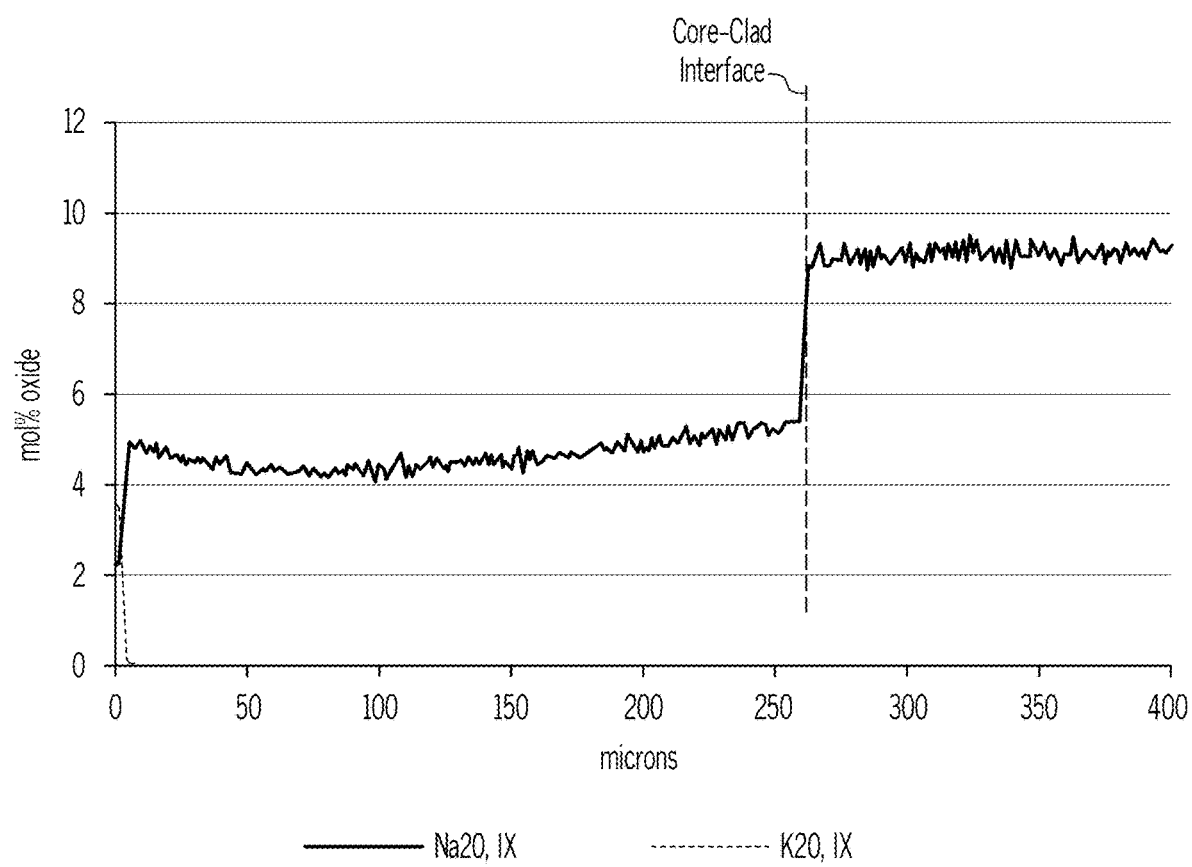
FIG. 5 graphically depicts the concentration of alkali metal oxides in laminated glass articles (Y-ordinate) as a function of depth (X-ordinate) for an ion exchanged sample of the laminated glass article.

The samples were also analyzed using electron microprobe analysis techniques to determine the concentration of $Li_2O$, $K_2O$, and $Na_2O$ as a function of depth both before and after strengthening by ion exchange. The glass clad layer of the as-drawn laminate (i.e., prior to ion exchange) had a concentration of approximately 4 mol. % $Na_2O$ and the glass core layer of the as-drawn laminate (i.e., prior to ion exchange) had a concentration of approximately 11.0 mol. % $Na_2O$. FIG. 5 graphically depicts the concentration of $Na_2O$ and $K_2O$ as a function of depth from the surface for the laminated glass articles after ion exchange in 20% $NaNO_3$/80% $KNO_3$ at 390° C. for 0.5 hours.

The microprobe data following ion exchange treatment at 390° C. for 0.5 hours depicted in FIG. 5 indicates that diffusion of $Na_2O$ and $K_2O$ into the glass clad layer occurred during ion exchange, thereby increasing the concentration of $Na_2O$ and $K_2O$ in the glass clad layer, particularly in areas near the surface of the glass clad layer (i.e., close to 0 on the x ordinate of the coordinate axes depicted in FIG. 5). The data also generally indicates that the concentration of $Na_2O$ in the glass clad layer decreases with increasing distance from the surface of the laminated glass article (i.e., depth=0), reaching a minimum at an intermediate point in the thickness of the glass clad layer, and increases from the intermediate point to the core-clad interface. Similarly, the concentration of $K_2O$ is a maximum proximate the surface and decreases with increasing distance from the surface of the laminated glass article. This data is consistent with the FSM data showing an increase in the surface compressive stress following ion exchange.

The surface dynamic impact strength of as-drawn samples of the laminated glass article and samples of the laminated glass article ion exchanged under different conditions were also tested according to the surface dynamic impact test procedure described herein. In particular, one set of samples was tested in as-drawn condition, one set of samples was tested after ion exchange in a molten salt bath of 5% $NaNO_3$/95% $KNO_3$ at 390° C. for 2.0 hours, one set of samples was tested after ion exchange in a molten salt bath of 5% $NaNO_3$/95% $KNO_3$ at 390° C. for 24 hours, one set of samples was tested after ion exchange in a molten salt bath of 20% $NaNO_3$/80% $KNO_3$ at 390° C. for 0.5 hours, and one set of samples was tested after ion exchange in a molten salt bath of 20% $NaNO_3$/80% $KNO_3$ at 390° C. for 7.5 hours. The samples of the laminated glass article were impacted with a disk of 30 grit SiC sandpaper using the surface dynamic impact test procedure described herein. The load at impact from each test was recorded. If the laminated glass article did not fail upon impact, the sandpaper disk was replaced with "fresh" sandpaper and the velocity of the piston to which the sandpaper is attached was increased. The process was repeated until failure of the sample occurred. The impact load at failure was recorded as the "surface dynamic impact strength" of the sample. For purposes of comparison, samples of a non-laminated, alkali aluminosilicate glass strengthened by ion exchange (hereinafter the "comparative" samples) were also tested to failure. As with the laminated glass articles, the comparative samples were also tested to failure.

Figure 6:
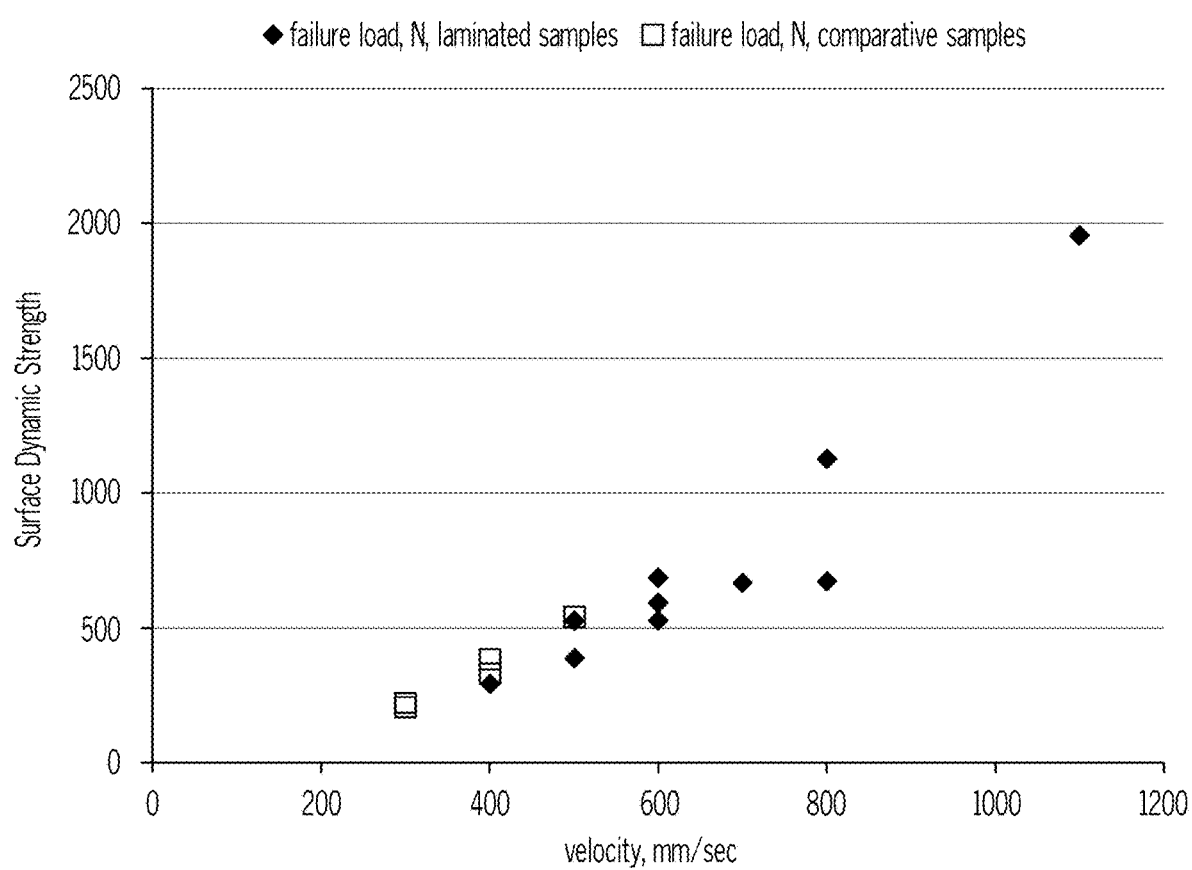
FIG. 6 graphically depicts the surface dynamic strength (Y-ordinate) as a function of piston velocity (X-ordinate) for samples of laminated glass articles and comparative samples.
Figure 7:
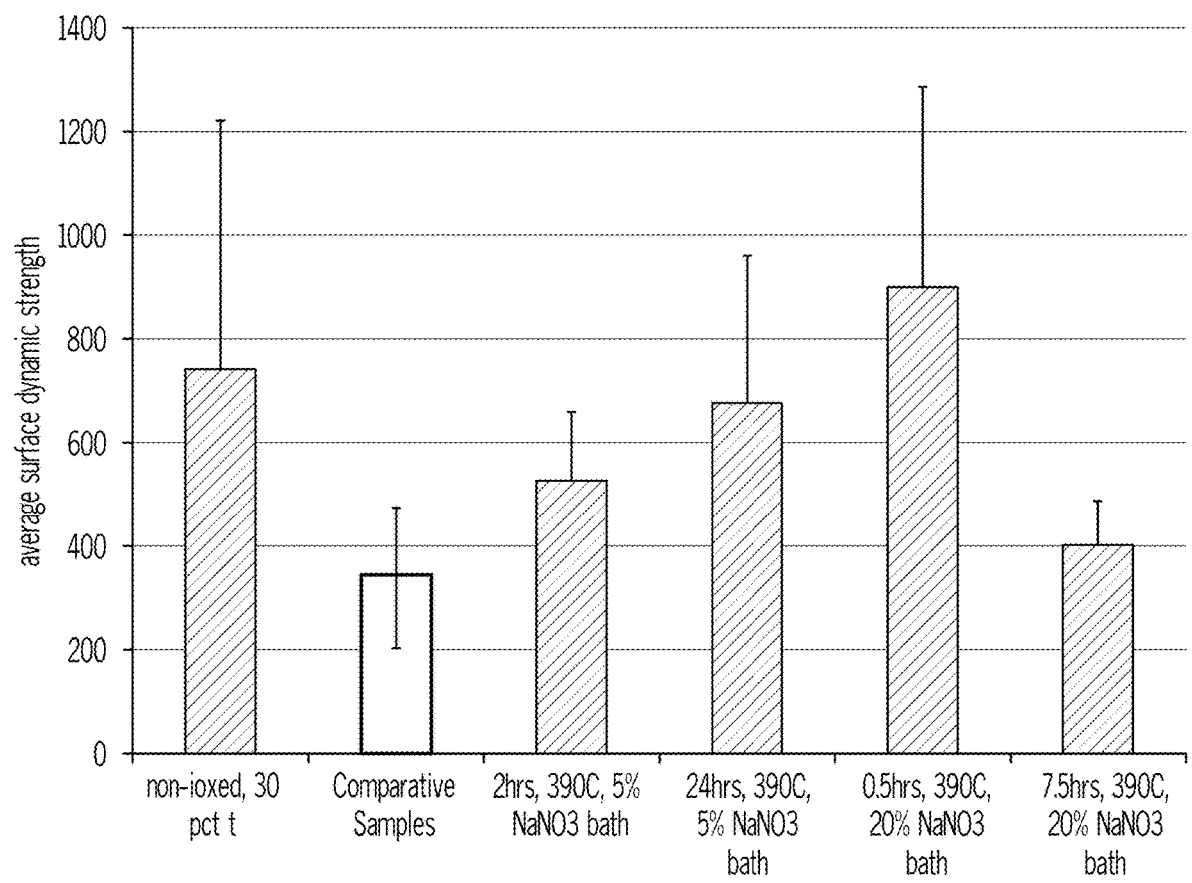
FIG. 7 graphically depicts the average surface dynamic strength (Y-ordinate) for samples of laminated glass articles and comparative samples.

FIG. 6 graphically depicts surface dynamic impact strength as a function of the velocity of the piston at failure for as-drawn laminated glass articles and comparative samples. As shown in FIG. 6, the laminated glass articles generally had a surface dynamic impact strength greater than or equal to 400 N, with most samples having a surface dynamic impact strength of greater than 500 N. However, the non-laminated, comparative samples had a surface dynamic impact strength of 500 N or less. In addition, FIG. 7 graphically depicts the average surface dynamic impact strength for the as-drawn laminated glass articles, the ion exchanged laminated glass articles, and the comparative samples. As shown in FIG. 7, the laminated glass articles had a greater average surface dynamic impact strength, both in as-drawn condition and after ion exchange, than the comparative examples.

The edge dynamic impact strength of as-drawn samples of the laminated glass article and samples of the laminated glass article after ion exchange were also tested according to the edge dynamic impact test procedure described herein. In particular, one set of samples was tested in as-drawn condition and one set of samples was tested after ion exchange in a molten salt bath of 100% $KNO_3$ at 390° C. for 1.0 hour. The samples were impacted with a ⅜ inch WC rod using the edge dynamic impact test procedure described herein. The load at impact from each test was recorded. If the laminated glass article did not fail upon impact, the velocity of the piston to which the WC rod was attached was increased. The process was repeated until failure of the sample occurred. The impact load at failure was recorded as the "edge dynamic impact strength" of the sample.

Figure 8:
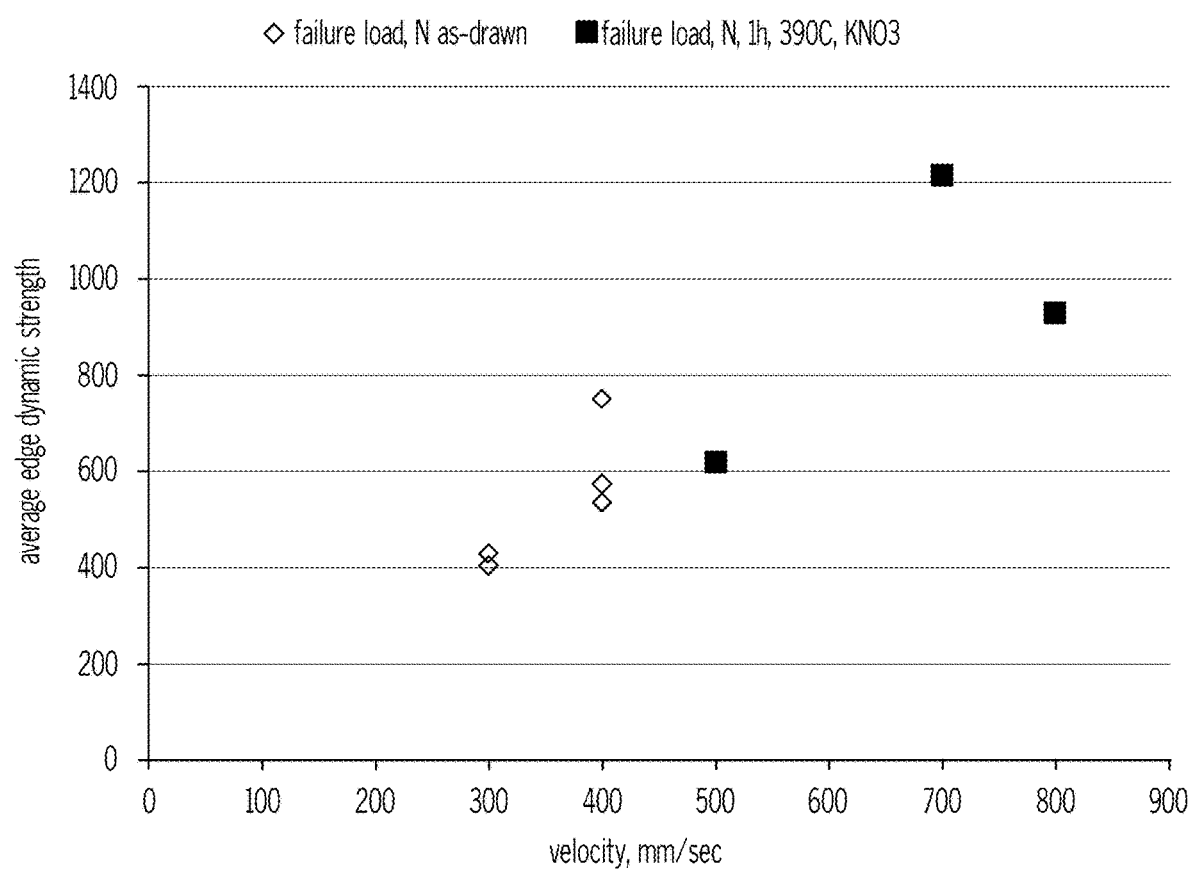
FIG. 8 graphically depicts the edge dynamic strength (Y-ordinate) as a function of piston velocity (X-ordinate) for samples of laminated glass articles and comparative samples.
Figure 9:
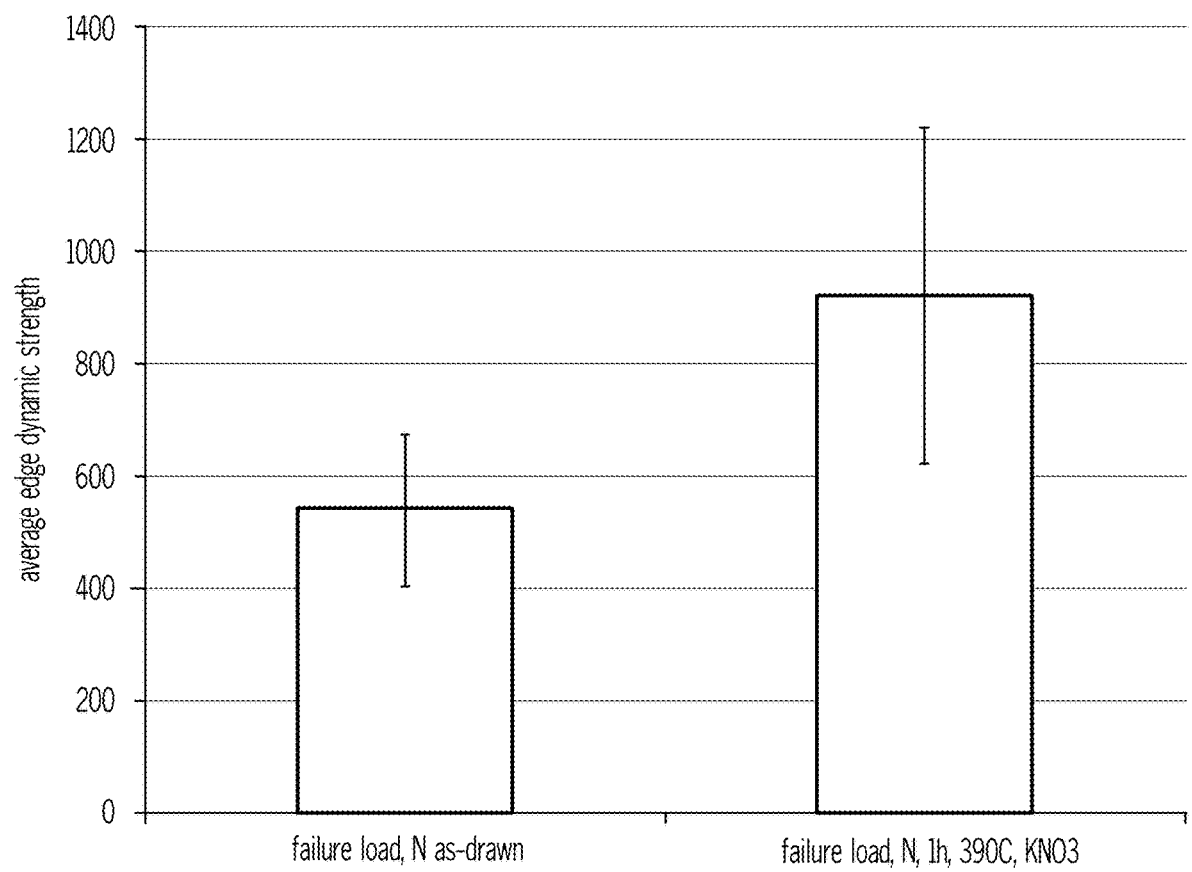
FIG. 9 graphically depicts the average edge dynamic strength (Y-ordinate) for samples of laminated glass articles and comparative samples.

FIG. 8 graphically depicts edge dynamic impact strength as a function of the velocity of the piston at failure for as-drawn laminated glass articles and ion exchanged laminated glass articles. As shown in FIG. 8, the laminated glass articles generally had an edge dynamic impact strength greater than or equal to 300 N, with the ion exchanged samples having an edge dynamic impact strength of greater than or equal to 500 N. In addition, FIG. 9 graphically depicts the average edge dynamic impact strength for the as-drawn laminated glass articles and the ion exchanged laminated glass articles. As shown in FIG. 9, the ion exchanged laminated glass articles had a greater average edge dynamic impact strength than the as-drawn laminated glass articles.

Example 2

A three-layered laminated glass article was formed with core glass composition C1 (Table 1) and clad glass composition CL1 (Table 2A). The glass clad layers had a thickness of approximately 200-250 μm. The glass core layer had a thickness of approximately 300 μm. The elastic modulus of the glass core layer was 76.67 GPa and the CTE was $84 \times 10^{-7}$/° C. The elastic modulus of the glass clad layers was 67.78 GPa and the CTE was $49.6 \times 10^{-7}$/C. Based on the values of the elastic moduli, Poisons ratio, and CTE for each glass, the compressive stress in the glass clad layers due to the CTE mismatch between the glass clad layers and the glass core layers was determined to be approximately 66 MPa. For purposes of this calculation, ΔT was estimated to be the difference between the lower strain point temperature and room temperature.

Samples of the laminated glass article were ion exchange strengthened by immersing the samples in a molten salt bath of 100 wt. % $KNO_3$ at a temperature of 390° C. for either 0.5 hours, 1 hour, 2 hours, 4 hours, 8 hours, 16 hours or 24 hours.

Following ion exchange strengthening, the compressive stress (CS) and depth of compression were determined with a fundamental stress meter (FSM) instrument. The sample ion exchanged for 0.5 hours had a surface compressive stress of approximately 575 MPa and a depth of compression of approximately 5 μm. The sample ion exchanged for 1 hour had a surface compressive stress of approximately 550 MPa and a depth of compression of approximately 7 μm. The sample ion exchanged for 2 hours had a surface compressive stress of approximately 525 MPa and a depth of compression of approximately 8 μm. The sample ion exchanged for 4 hours had a surface compressive stress of approximately 510 MPa and a depth of compression of approximately 12 µm. The sample ion exchanged for 8 hours had a surface compressive stress of approximately 475 MPa and a depth of compression of approximately 16 µm. The sample ion exchanged for 16 hours had a surface compressive stress of approximately 470 MPa and a depth of compression of approximately 24 µm. The sample ion exchanged for 24 hours had a surface compressive stress of approximately 450 MPa and a depth of compression of approximately 28 µm.

This data generally indicates that ion exchange further increased the compressive stress at the surfaces of the laminated glass articles. It is believed that this increase in the surface compressive stress will further enhance the ability of the laminated glass articles to withstand flaws introduced at the surface without failure. Compared with Example 1 above, this data also shows that ion exchange in 100% $KNO_3$ generally increased the surface compressive stress and the depth of compression relative to laminates ion exchanged in 20% $NaNO_3$/80% $KNO_3$.

Example 3

The ion exchangeability of the glass compositions of the glass core layers and the glass clad layers identified in Tables 1A, 1B, 2A, and 2B were assessed to determine the effect of free volume on ion exchange. Specifically, 1 mm thick coupons of each glass composition were annealed and then ion exchanged in a molten salt bath of 100% $KNO_3$ at 410° C. for 4 hours. Following ion exchange, the samples were analyzed with a fundamental stress meter (FSM) instrument to determine the surface compressive stress and depth of compression due to ion exchange. The results are reported in Tables 3A, 3B, 4A, and 4B.

TABLE 3A

Ion Exchange Characteristics of Example Glass Core Layer Compositions

| | C1 | C2 | C3 | C4 | C5 | C6 | C7 |
|---|---|---|---|---|---|---|---|
| Compressive Stress (MPa) | 1031 | 1210 | 1260 | 1286 | 1331 | 1277 | 1339 |
| Depth of compression (µm) | 26 | 10 | 9 | 9 | 9 | 10 | 9 |

TABLE 3B

Ion Exchange Characteristics of Example Glass Core Layer Compositions

| | C8 | C9 | C10 | C11 | C12 | C13 |
|---|---|---|---|---|---|---|
| Compressive Stress (MPa) | 1201 | 1201 | 1195 | 1242 | 1235 | 1265 |
| Depth of compression (µm) | 11 | 13 | 6 | 12 | 10 | 12 |

TABLE 4A

Ion Exchange Characteristics of Example Glass Clad Layer Compositions

| | CL1 | CL2 | CL3 | CL4 | CL5 | CL6 |
|---|---|---|---|---|---|---|
| Compressive Stress (MPa) | 415 | 848 | 775 | 799 | 702 | 637 |

TABLE 4A-continued

Ion Exchange Characteristics of Example Glass Clad Layer Compositions

| | CL1 | CL2 | CL3 | CL4 | CL5 | CL6 |
|---|---|---|---|---|---|---|
| Depth of compression (µm) | 14 | 13 | 15 | 13 | 15 | 15 |

TABLE 4B

Ion Exchange Characteristics of Example Glass Clad Layer Compositions

| | CL7 | CL8 | CL9 | CL10 | CL11 | CL12 | CL13 |
|---|---|---|---|---|---|---|---|
| Compressive Stress (MPa) | 566 | 830 | 825 | 813 | 813 | 771 | 795 |
| Depth of compression (µm) | 14 | 10 | 9 | 9 | 8 | 7 | 6 |

As shown in Tables 3A-4B, the glass core compositions achieved a higher surface compressive stress, demonstrating that glasses with a lower free volume (i.e., glasses with a higher refractive index) achieve higher compressive stresses when subjected to the same ion exchange conditions.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A laminated glass article comprising:
a glass core layer formed from an alkali-aluminosilicate core glass composition and comprising a core glass elastic modulus $E_C$; and
at least one glass clad layer fused directly to the glass core layer, the at least one glass clad layer formed from an ion exchangeable, alkali-aluminosilicate clad glass composition different than the alkali-aluminosilicate core glass composition, the at least one glass clad layer comprising a clad glass elastic modulus $E_{CL}$, wherein:
the laminated glass article has a total thickness T and the at least one glass clad layer has a thickness $T_{CL}$ that is greater than or equal to 30% of the total thickness T;
$E_C$ is at least 5% greater than $E_{CL}$; and
$E_C$ is greater than 76.5 GPa and less than or equal to 90 GPa.

2. The laminated glass article of claim 1, wherein $E_{CL}$ is less than or equal to 76.5 GPa.

3. The laminated glass article of claim 2, wherein $E_{CL}$ is greater than or equal to 60 GPa.

4. The laminated glass article of claim 1, wherein a difference between $E_C$ and $E_{CL}$ is greater than or equal to 5 GPa.

5. The laminated glass article of claim 1, wherein the thickness $T_{CL}$ of the at least one glass clad layer is greater than or equal to 35% of the total thickness T.

6. The laminated glass article of claim 1, wherein a core refractive index $n_C$ of the glass core layer is greater than a clad refractive index $n_{CL}$ of the at least one glass clad layer.

7. The laminated glass article of claim 6, wherein the clad refractive index $n_{CL}$ is greater than or equal to 1.45 and less than or equal to 1.55.

8. The laminated glass article of claim 1, wherein the at least one glass clad layer comprises a first glass clad layer and a second glass clad layer, wherein:
the first glass clad layer is fused directly to a first surface of the glass core layer; and
the second glass clad layer is fused directly to a second surface of the glass core layer opposite the first surface of the glass core layer.

9. The laminated glass article of claim 1, wherein:
the glass core layer has a core coefficient of thermal expansion $CTE_C$ from 20° C. temperature to 300° C.;
the at least one glass clad layer has a clad coefficient of thermal expansion $CTE_{CL}$ from 20° C. to 300° C.; and
$CTE_C$ is greater than or equal to $CTE_{CL}$.

10. The laminated glass article of claim 9, wherein a surface compressive stress in the laminated glass article due to a difference between $CTE_C$ and $CTE_{CL}$ is greater than or equal to 10 MPa and less than or equal to 100 MPa.

11. The laminated glass article of claim 10, wherein the laminated glass article has a depth of compression due to the difference between $CTE_C$ and $CTE_{CL}$ that is greater than or equal to 20% of the total thickness T.

12. The laminated glass article of claim 1, wherein the glass core layer is formed from an ion exchangeable core glass composition.

13. The laminated glass article of claim 12, wherein:
the glass core layer is exposed at an edge of the laminated glass article; and
the glass core layer comprises a surface compressive stress and depth of compression at the edge of the laminated glass article.

14. The laminated glass article of claim 1, wherein the laminated glass article is ion exchange strengthened such that the laminated glass article comprises a compressive stress region due to ion exchange extending from a surface of the at least one glass clad layer and into the total thickness T of the laminated glass article to a depth of compression DOC.

15. The laminated glass article of claim 14, wherein:
the laminated glass article has a surface compressive stress $CS_0$ due to ion exchange at the surface of the at least one glass clad layer; and
the depth of compression DOC due to ion exchange is less than or equal to 30% of the thickness $T_{CL}$ of the at least one glass clad layer.

16. The laminated glass article of claim 14, wherein:
the glass core layer has a core coefficient of thermal expansion $CTE_C$ from 20° C. to 300° C.;
the at least one glass clad layer has a clad coefficient of thermal expansion $CTE_{CL}$ from 20° C. to 300° C.; and
$CTE_C$ is greater than or equal to $CTE_{CL}$.

17. The laminated glass article of claim 14, wherein a concentration of $Na_2O$ in the at least one glass clad layer decreases from a surface of the at least one glass clad layer, is a minimum at an intermediate point within a thickness of the at least one glass clad layer, and increases from the intermediate point to an interface layer between the at least one glass clad layer and the glass core layer.

18. The laminated glass article of claim 14, wherein a weight gain due to ion exchange strengthening is less than 0.5%.

19. The laminated glass article of claim 14, wherein the laminated glass article has a Knoop scratch initiation threshold greater than or equal to 2 N and less than or equal to 8 N.

20. The laminated glass article of claim 1, comprising a surface dynamic strength greater than or equal to 400 N.

21. The laminated glass article of claim 1, comprising an edge dynamic strength greater than or equal to 200 N.

22. A laminated glass article comprising:
a glass core layer formed from an ion exchangeable, alkali-aluminosilicate core glass composition and comprising a core refractive index $n_C$ and a core coefficient of thermal expansion $CTE_C$ from 20° C. temperature to 300° C.; and
at least one glass clad layer fused directly to the glass core layer, the at least one glass clad layer formed from an ion exchangeable, alkali-aluminosilicate clad glass composition different than the ion exchangeable, alkali-aluminosilicate core glass composition, the at least one glass clad layer comprising a clad refractive index $n_{CL}$ and a clad coefficient of thermal expansion $CTE_{CL}$ from 20° C. to 300° C., wherein:
the laminated glass article has a total thickness T and the at least one glass clad layer has a thickness $T_{CL}$ that is greater than or equal to 30% of the total thickness T;
the core refractive index $n_C$ is greater than or equal to 1.506 and less than or equal to 1.55;
the core refractive index $n_C$ of the glass core layer is greater than the clad refractive index $n_{CL}$ of the at least one glass clad layer; and
$CTE_C$ is greater than or equal to $CTE_{CL}$.

23. The laminated glass article of claim 22, wherein the clad refractive index $n_{CL}$ is greater than or equal to 1.45 and less than or equal to 1.55.

24. The laminated glass article of claim 22, wherein a surface compressive stress in the laminated glass article due to a difference between $CTE_C$ and $CTE_{CL}$ is greater than or equal to 10 MPa and less than or equal to 100 MPa.

25. The laminated glass article of claim 24, wherein the laminated glass article has a depth of compression due to the difference between $CTE_C$ and $CTE_{CL}$ that is greater than or equal to 20% of the total thickness T.

26. The laminated glass article of claim 22, wherein the laminated glass article has a Knoop scratch initiation threshold greater than or equal to 2 N and less than or equal to 8 N.

27. The laminated glass article of claim 22, wherein:
the laminated glass article is ion exchange strengthened;
a surface compressive stress $CS_0$ due to ion exchange at a surface of the at least one glass clad layer is greater than or equal to 200 MPa; and
a depth of compression DOC due to ion exchange is less than or equal to 20% of the thickness $T_{CL}$ of the at least one glass clad layer.

28. The laminated glass article of claim 22, comprising a surface dynamic strength greater than or equal to 400 N.

29. The laminated glass article of claim 22, comprising an edge dynamic strength greater than or equal to 200 N.

* * * * *